US010126114B2

(12) United States Patent
Dowski, Jr. et al.

(10) Patent No.: US 10,126,114 B2
(45) Date of Patent: Nov. 13, 2018

(54) ANGULAR LOCALIZATION SYSTEM, ASSOCIATED REPOSITIONABLE MECHANICAL STRUCTURE, AND ASSOCIATED METHOD

(71) Applicant: ASCENTIA IMAGING, INC., Boulder, CO (US)

(72) Inventors: Edward R. Dowski, Jr., Steamboat Springs, CO (US); Gregory Johnson, Boulder, CO (US)

(73) Assignee: Ascentia Imaging, Inc., Boulder, CO (US)

( * ) Notice: Subject to any disclaimer, the term of this patent is extended or adjusted under 35 U.S.C. 154(b) by 208 days.

(21) Appl. No.: 15/162,329

(22) Filed: May 23, 2016

(65) Prior Publication Data
US 2016/0341540 A1 Nov. 24, 2016

Related U.S. Application Data

(60) Provisional application No. 62/164,696, filed on May 21, 2015.

(51) Int. Cl.
*G01B 11/00* (2006.01)
*G01S 3/783* (2006.01)

(52) U.S. Cl.
CPC ............ *G01B 11/002* (2013.01); *G01S 3/783* (2013.01)

(58) Field of Classification Search
CPC ....... G01B 11/002; G01B 11/00; G01S 3/783; G01S 3/782; G01S 3/7835; G01S 3/74
See application file for complete search history.

(56) References Cited

U.S. PATENT DOCUMENTS

| 4,830,485 A | 5/1989 | Penney et al. |
| 5,010,885 A | 4/1991 | Fink et al. |

(Continued)

FOREIGN PATENT DOCUMENTS

| WO | WO 2013/103725 A1 | 7/2013 |
| WO | WO/2013103275 | 7/2013 |
| WO | WO2014175931 | 10/2014 |

OTHER PUBLICATIONS

"International Preliminary Report on Patentability re Application No. PCT/US11/51751", dated Feb. 13, 2012, p. 11 Published in: US.

(Continued)

*Primary Examiner* — Que T Le
*Assistant Examiner* — Jennifer Bennett
(74) *Attorney, Agent, or Firm* — Lathrop Gage LLP

(57) ABSTRACT

An angular localization system for determining an object's location includes a signal processor and three channels have a respective first, second, and third photodetector. The first channel images a first portion of an optical signal from which the first photodetector generates a first electrical signal. The second channel images a second portion of the optical signal onto a slow-varying optical mask having a strictly monotonic transmissivity along a dimension x. The second photodetector converts the second portion into a second electrical signal. The third channel images a third portion of the optical signal onto a fast-varying optical mask having a spatially-varying transmissivity having a same value at more than one value of x. The third photodetector converts the third portion into a third electrical signal. The signal processor is configured to determine, from each electrical signal, a respective signal amplitude, and determine the location parameter by comparing the signal amplitudes.

18 Claims, 10 Drawing Sheets

(56) References Cited

U.S. PATENT DOCUMENTS

| | | | |
|---|---|---|---|
| 5,816,477 | A | 10/1998 | Shimizu |
| 6,104,844 | A | 8/2000 | Alger-Meunier |
| 6,184,974 | B1 | 2/2001 | Neal et al. |
| 6,363,168 | B1 | 3/2002 | Kakuma |
| 6,653,030 | B2 | 11/2003 | Mei et al. |
| 7,248,407 | B2 | 7/2007 | Kwon et al. |
| 7,256,895 | B2 | 8/2007 | Castonguay |
| 7,295,314 | B1 | 11/2007 | Spady et al. |
| 7,591,557 | B2 | 9/2009 | Plummer |
| 7,639,369 | B2 | 12/2009 | Owner-Petersen et al. |
| 7,769,419 | B2 | 8/2010 | Daly |
| 7,926,942 | B2 | 4/2011 | Plummer |
| 7,959,286 | B2 | 6/2011 | Plummer |
| 8,158,917 | B2 | 4/2012 | Li et al. |
| 8,274,031 | B2 | 9/2012 | Nakai |
| 8,451,452 | B2 | 5/2013 | Podoleanu et al. |
| 8,569,680 | B2 | 10/2013 | Luke et al. |
| 8,670,171 | B2 | 3/2014 | Martin et al. |
| 8,749,657 | B2 | 6/2014 | Iwane |
| 8,822,894 | B2 | 9/2014 | Zheng et al. |
| 9,212,899 | B2 | 12/2015 | Johnson et al. |
| 2003/0193647 | A1 | 10/2003 | Neal et al. |
| 2005/0007603 | A1 | 1/2005 | Arieli et al. |
| 2005/0249487 | A1 | 11/2005 | Gutierrez |
| 2006/0160250 | A1 | 5/2006 | Bonassar et al. |
| 2007/0122049 | A1 | 5/2007 | Dowski, Jr. et al. |
| 2007/0177011 | A1 | 8/2007 | Lewin et al. |
| 2007/0194207 | A1 | 8/2007 | Wirth |
| 2007/0211786 | A1 | 9/2007 | Shattil |
| 2007/0247638 | A1 | 10/2007 | Owner-Petersen et al. |
| 2009/0034088 | A1 | 2/2009 | Delaney et al. |
| 2010/0045934 | A1 | 2/2010 | Neal et al. |
| 2010/0165134 | A1 | 7/2010 | Dowski, Jr. et al. |
| 2010/0177277 | A1 | 7/2010 | Kokonaski et al. |
| 2010/0302159 | A1 | 12/2010 | Findlay et al. |
| 2011/0211099 | A1 | 9/2011 | Nayar et al. |
| 2012/0022785 | A1 | 1/2012 | DiBernardo et al. |
| 2012/0092543 | A1 | 4/2012 | Afshari et al. |
| 2012/0241009 | A1 | 9/2012 | Reid |
| 2012/0327287 | A1 | 12/2012 | Meyers et al. |
| 2015/0292915 | A1* | 10/2015 | Viren ............... G01D 5/347 250/231.1 |
| 2016/0161914 | A1* | 6/2016 | Onural ............... G03H 1/2294 359/9 |
| 2016/0341540 | A1 | 11/2016 | Dowski et al. |

OTHER PUBLICATIONS

"International Search Report and Written Opinion re Application No. PCT/US14/10562", dated Nov. 13, 2014, p. 12 Published in: US.

13733703.6 European Search Report and opinion dated Jan. 13, 2016, 11 pages.

Barbarino, S., et al., "A review of morphing aircraft," Journal of Intelligent Material Systems and Structures, vol. 22, 823-877, Jun. 2011.

Bruckner, A.. et al., "A Multi Aperture Approach to Wafer-Level Camera Lenses", "MOEMS and Miniaturized Systems X", Jan. 27, 2011, p. 10 vol. 7930, No. 79300B, Publisher: Proc. of SPIE Photonics W., Published in: US.

Chen, F., et al., "Overview of Three-Dimensional Shape Measurement using Optical Methods", "Optical Engineering", Jan. 2000, pp. 10-22, vol. 39, No. 1, Publisher: Soc'y of Photo-Optical Instrumentation Engineers, Published in: US.

Dardari, D., "Ranging With Ultrawide Bandwidth Signals in Multipath Environments," Proceedings of the IEEE , vol. 97, No. 2, pp. 404-426, Feb. 2009.

Donaldson, R.R., et al., "Design and Construction of a Large, Vertical Axis Diamond Turning Machine", "Proc. of the SPIE", 1983, pp. 62-67, vol. 433, Publisher: Int'l Soc'y for Optical Engineering, Published in: US.

Gill, D.D., et al., "Design and Manufacturing of Complex Optics: The Dragonfly Eye Optic", "Sandia Report", Jan. 2007, pp. 1-32, Publisher: Sandia Nat'l Laboratories, Published in: US.

Goodman, J.W., "Introduction to Fourier Optics", "Webpage downloaded from Amazon.com Dec. 13, 2011", 1968, Publisher: McGraw-Hill Book Co., New York, N.Y., Published in: US.

Khademi, S., "A Sub Pixel Resolution Method," World academy of science, engineering and technology (WASET), 70, pp. 578-581, 2010.

Kirmse, T., "Development of a multi camera system for flap gap observation in flight testing," 17th SFTE (EC) Symposium, Amsterdam, The Netherlands, Jun. 12-14, 2006.

Krishnan, G., et al., "Towards a True Spherical Camera", "Human Vision and Electronic Imaging XIV", 2009, p. 1-13, vol. 7240, No. 724002, Publisher: Proc. of SPIE-IS&T Electronic Imaging Keynote Address, Published in: US.

Kurtz, R., et al., "Improving the Accuracy of Surface Metrology", "Optical Engineering", Jul. 2011, pp. 1-6, vol. 50, No. 7, Publisher: Soc'y of Photo-Optical Instrumentation Engineers, Published in: US.

Lange, R. "Demodulation pixels in CCD and CMOS technologies for time-of-flight ranging," Sensors, Camera Systems for Scientific, Industrial Applications II, vol. 3965, 2000.

Leroux, C., et al., "Estimation of Centroid Positions with a Matched-Filter Algorithm: Relevance for Aberromertry of the Eye", "Optics Express", Jan. 18, 2010, pp. 1197-1206, vol. 18, No. 2, Publisher: Optical Soc'y of Am., Published in: US.

Levin, A., et al., "Understanding Camera Trade-Offs through a Bayesian Analysis of Light Filed Projections", "Computer Sci. and Artificial Intelligence Laboratory Technical Rep.", Apr. 16, 2008, Publisher: Presented at European Conference on Computer Vision (ECCV) Oct. 2008, Published in: US.

Lohmann, A., "Space-bandwidth product of optical signals and systems," J. Opt. Soc. Am., vol. 13, No. 3, 470-473 Mar. 1996.

McCall, B., et al., "Fabrication of Plastic Microlens Arrays for Array Microscopy by Diamond Milling Techniques", "Micromachining and Miocrofabrication Process Technology XV—Proc. of SPIE", 2010, pp. 1-10, vol. 7590, No. 75900A, PublisherA, Publisher: Soc'y of Photo-Optical Instrumentation Engineers, Published in: US.

Millioz et al., Short Time Fourier Transform Probability Distribution for Time-Frequency Segmentation. Francis Castanie. 2006, IEEE Signal Processing Society, pp. III-448-451, 2006. <hal-00085154>.

Min, Z., et al., "Coordinate Measurement Method Based on Coding Target", "Sixth Int'l Symp. on Precision Engineering Measurement and Instrumentation", 2010, vol. 7544, No. 754412, Publisher: Proc. of SPIE, Published in: US.

Moylan, S., et al., "Development of a Metrology Frame to Improve the Positioning Accuracy of Micro/Meso-Scale Machine Tools", "Int. J. Mechatronics and Manufacturing Systems", 2009, pp. 600-619, vol. 2, No. 5/6, Publisher: Inderscience Enterprises Ltd., Publisher in: US.

Murata, J., "Pico-Precision Displacement Sensor Using Digital Image Analysis", "Nuclear Sci. Symp. Conf. Rec.", 2005, pp. 675-679, Publisher: IEEE, Publisher in: US.

Nalpantidis, L. et al. "Stereovision-Based Algorithm for Obstacle Avoidance," Intelligent Robotics and Applications, Lecture Notes in Computer Science vol. 5928, 2009, pp. 195-204.

Neal, David R., et al., "Shack-Hartmann Wavefront Sensor Precision and Accuracy", "Advanced Characterization Tech. for Optical, Semiconductor, and Data Storage Components", 2002, pp. 148-160, vol. 4779, Publisher: Proc. of SPIE.

Neifeld, M., "Information, resolution, and space-bandwidth product," Optics Letters, vol. 23, No. 18, 1477-1479, Sep. 15, 1998.

Popov, A.V., "Closed-Loop Control Simulations on a Morphing Wing" Journal of Aircraft, vol. 45, No. 5, 1794-1803, Oct. 2008.

Scheiding, S., et al., "Freeform Manufacturing of a Microoptical Lens Array on a Steep Curved Substrate by use of a Voice Coil Fast Tool Servo", "Optics Express—Presented at Proc. of Structured and Freeform Surfaces 2001 Spring Topical Meeting", Nov. 21, 2011, pp. 23938-23951, vol. 19, No. 24, Publisher: Optical Soc'y of Am., Published in: US.

(56) References Cited

OTHER PUBLICATIONS

Topa, D.M., et al., "Optimized Method for Focal Spot Location using Center of Mass Algorithms", "Proc. of SPIE", 2002, pp. 1-14, vol. 4769, No. 14, Publisher: Int'l Soc'y for Optical Engineering, Published in: US.

Valasek, J. et al. "Vision Based Sensor and Navigation System for Autonomous Aerial Refueling," 1st UAV Conference. Journal of Guidance, Control, and Dynamics vol. 28, No. 5, Sep.-Oct. 2005.

Van Nieuwenhove, D., "Time-of-flight Optical Ranging Sensor Based on a Current Assisted Photonic Demodulator," Proceedings Symposium IEEE/LEOS Benelux Chapter, Eindhoven, 2006.

Veerman, H.P.J., "Highly Accurate Aircraft In-Flight Wing Deformation Measurements Based on Image Correlation," Advanced In-Flight Measurement Techniques Research Topics in Aerospace, pp. 15-32, 2013.

Vyas, A., et al., "Optimization of Existing Centroiding Algorithms for Shack Hartmann Sensor", "Proc. of the Nat'l Conf. on Innovative Computational Intelligence & Security System", Apr. 4, 2009, pp. 400-405, Published in: US.

Yin, X. et al., "Automatic Detection for Shack-Hartmann Wavefront Senor", "Int'l Conf. on Innovative Computational Intelligence & Security System", Jul. 17, 2009, pp. 1986-1991, Publisher: IEEE/ASME, Published in: SG.

Non-Final Office Action dated Oct. 3, 2017 in U.S. Appl. No. 14/939,944, 49 pp.

International Search Report for PCT/US2016/068434 dated Apr. 12, 2017, 4 pp.

\* cited by examiner

ANGULAR LOCALIZATION SYSTEM, ASSOCIATED REPOSITIONABLE MECHANICAL STRUCTURE, AND ASSOCIATED METHOD

CROSS-REFERENCE TO RELATED APPLICATIONS

This application claims priority to U.S. Provisional Application No. 62/164,696 filed May 21, 2015, which is incorporated by reference in its entirety.

BACKGROUND

A localization system tracks location and movement of one or more objects within a localization domain that are the field of view of the localization system. An angle-based localization system determines locations, in part, by computing relative angles between tracked objects and a location on a plane. Angle-based localization systems are often preferable to image-based localization systems, for example, when high localization precision is required and/or when the size of the localization domain far exceeds that of an image sensor of an image-based localization system.

SUMMARY OF THE INVENTION

In one embodiment, an angular localization system for determining a location parameter of an object includes a receiver and a signal processor. The receiver includes a first channel, a second channel, and a third channel. The first channel includes (i) a first lens for imaging a first portion of an optical signal from the object and (ii) a first photodetector for converting the imaged first portion into a first electrical signal. The second channel includes (i) a second lens for imaging a second portion of the optical signal onto a slow-varying optical mask having a strictly monotonic transmissivity $T_2(x)$ in an x-range of a spatial dimension x and (ii) a second photodetector for converting the second portion, transmitted through the slow-varying optical mask, into a second electrical signal. The third channel includes (i) a third lens for imaging a third portion of the optical signal onto a fast-varying optical mask having a spatially-varying transmissivity $T_3(x)$ having a same value at more than one value of x in the x-range, and (ii) a third photodetector for converting the third portion, transmitted through the fast-varying optical mask, into a third electrical signal. The signal processor is configured to (i) determine first, second, and third signal amplitudes from the first, second, and third electrical signals, respectively, and (ii) determine the location parameter by comparing the first, second, and third signal amplitudes.

In another embodiment, a method for determining a location parameter of an object includes steps 1-10. In step 1, the method images a first portion of a modulated optical signal from the object. In step 2, the method determines a first signal amplitude of the imaged first portion. In step 3, the method images a second portion of the modulated optical signal onto a slow-varying optical mask having a strictly monotonic transmissivity $T_2(x)$, in an x-range of a spatial dimension x. In step 4, the method determines a second signal amplitude of the second portion transmitted through the slow-varying optical mask. In step 5, the method images a third portion of the modulated optical signal onto a fast-varying optical mask having a spatially-varying transmissivity $T_3(x)$ having a same value at more than one value of x in the x-range. In step 6, the method determines a third signal amplitude of the third portion transmitted through the fast-varying optical mask. In step 7, the method determines a course-estimate location $x_2$ in the x-range and corresponding to a location on the slow-varying optical mask having transmissivity equal to the second signal amplitude divided by the first signal amplitude. In step 8, the method determines a plurality of candidate locations $\{x_{3,1}, x_{3,2}, x_{3,3}, \ldots, x_{3,n}\}$ in the x-range and corresponding to locations on the fast-varying optical mask having transmissivity equal to the third signal amplitude divided by the first signal amplitude. In step 9, the method determines a refined-estimate location, of the plurality of candidate locations, closest to course-estimate location $x_2$. In step 10, the method determines, based on the refined-estimate location, an angle of the object with respect to a plane perpendicular to the spatial dimension x and intersecting the masks.

In a third embodiment, a repositionable mechanical structure includes a repositionable part, an emitter, a controller, and an actuator. The emitter is located on the repositionable part and is configured to emit an optical signal to a receiver. The controller is adapted to receive a control signal from a transmitter communicatively coupled to the receiver. The actuator is communicatively coupled to the controller and mechanically coupled to the repositionable part and is configured to actuate the repositionable part based on the control signal.

DETAILED DESCRIPTION OF THE EMBODIMENTS

Figure 1:
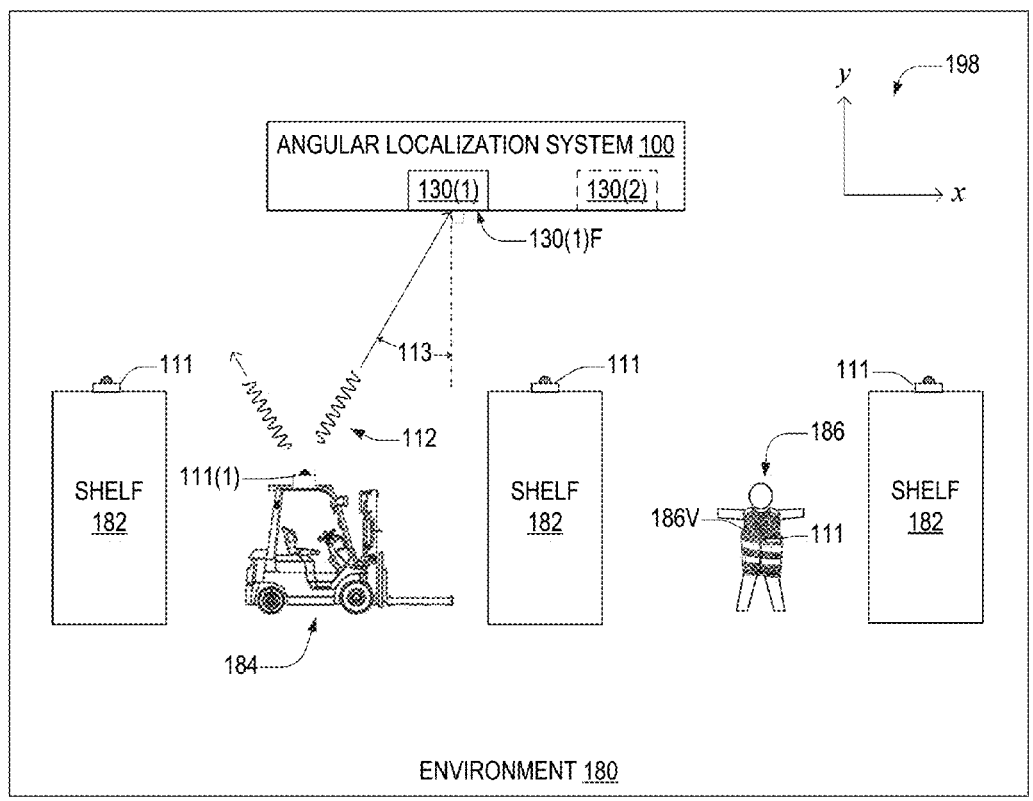
FIG. 1 shows an angular localization system in an exemplary use scenario, in an embodiment.

FIG. 1 shows an angular localization system 100 in an exemplary use scenario within an environment 180. Environment 180 is for example a warehouse, a factory, a fabrication plant, a job site, a construction site (for a road, building, etc.), a landscaping site, and may be located either indoors or outdoors. The physical scale, electrical bandwidth, and required localization precision in this scenario are each sufficiently large as to make image-processing-based localization very difficult and/or resource intensive. Localization system 100 may include any feature of optical guidance systems 500, 600, and 700 described in U.S. application Ser. No. 14/165,946.

Environment 180 includes a vehicle 184, a person 186 wearing a vest 186V, and obstructions, such as shelves 182, that limit a human's line-of-sight ability. Vehicle 184 is for example a forklift or other type of vehicle with a repositionable part, such as a construction equipment (backhoe, excavator, bulldozer, etc.). Localization system 100 includes a receiver 130(1) and tracks positions of emitters 111, which are on trackable objects such as vehicle 184, vest 186V, and shelves 182. Receiver 130(1) has a front surface 130(1)F in a plane perpendicular to the x-y plane of a coordinate system 198. Localization system 100 optionally includes one or more additional receivers, such as a second receiver 130(2).

Emitters 111 may be part of localization system 100. In an exemplary mode of operation receiver 130(1) receives a signal 112 emitter 111(1), from which localization system 100 determines location information about emitter 111(1).

One function of angular localization system 100 may be to localize and report the locations of objects or people, such as vehicle 184 and person 186. For example, angular localization system 100 determines a location angle 113 in the x-y plane between emitter 111(1) and front surface 130(1)F. Angular localization system 100 may also determine a second localization angle of emitter 111(1) with respect to receiver 130(2). Such location data may be used to control object locations, such as vehicle 184, for purposes of navigation and collision avoidance.

Figure 2:
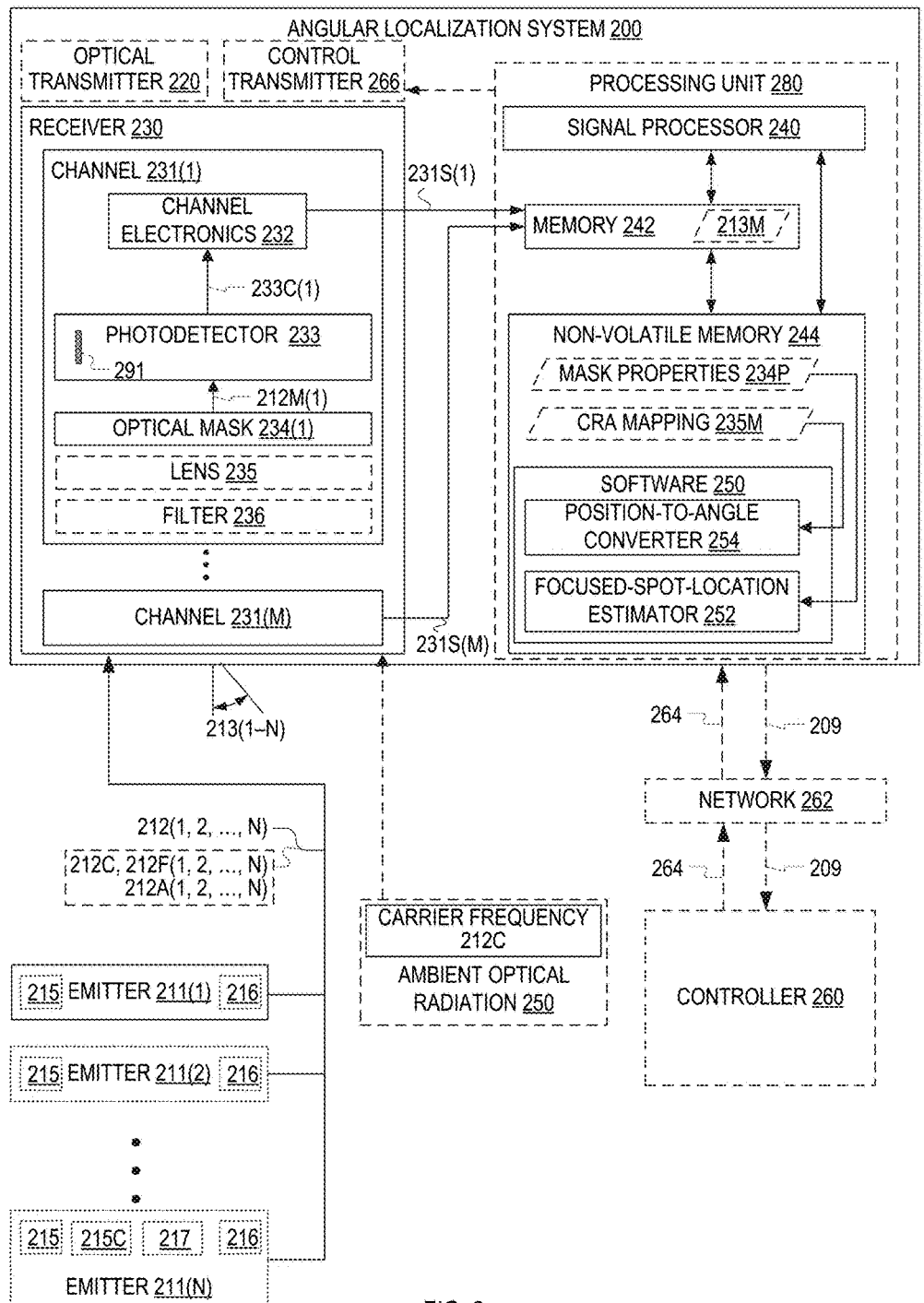
FIG. 2 illustrates an embodiment of an angular localization system that is an example of localization system of FIG. 1.

FIG. 2 illustrates one exemplary angular localization system 200, which is an example of localization system 100. Angular localization system 200 includes a receiver 230 and optionally components within a processing unit 180: a memory 242, a non-volatile memory 244, and a signal processor 240. Angular localization system 200 may also include optionally emitters 211. Receiver 230 and emitters 211 may be implemented as receiver 130(1) and emitters 111, respectively Emitters 211 include at least emitter 211(1) and may further include any number of emitters 211(2) through 211(N). Each emitter 211(1-N) provides a respective optical signal 212(1-N) have a frequency 212C. In the forgoing example, optical signals 212(1-N) have modulation frequency 212F(1-N) and a corresponding frequency-domain amplitude 212A(1-N), in which case frequency 212C is a carrier frequency. In a typical use scenario, angular localization system 200 is in an environment that includes ambient optical radiation 250 that includes frequency 212C in its optical spectrum. Modulation frequencies 212F of optical signals 212 enables angular localization system 200 to distinguish a signal propagating from emitters 211 from the component of ambient optical radiation 250 having frequency 212C.

An emitter 211 may include a light source 215, such as a light-emitting diode (LED) or laser diode, that generates optical signal 212. An emitter 211 may also include electrical circuitry 215C configured to modulate output of light source 215. Optical signal 212 may be originally generated by a source distant from an emitter 211, such as an optical transmitter 220, which is for example part of angular localization system 200 and may be attached to or proximate receiver 230. An emitter 211 may include a reflector 216 for reflecting optical signal 212 generated by optical transmitter 220 toward receiver 230.

Modulating optical signals 212(1-N) with a respective modulation frequency 212F(1-N) is one way to distinguish emitters 211 from one another. Alternatively, each emitter 211 may emit a different carrier frequency (212C(1, 2, . . . N)) or polarization. A channel 231 may include a filter 236 for transmitting a carrier frequency 212C or polarization corresponding to that of light propagating from a single emitter 211. Filter 236 includes, for example, at least one of an optical bandpass filter, a linear polarizer, and a circular polarizer.

Frequency 212C corresponds, for example, to one or more free-space optical wavelengths between 0.75 μm and 2.0 μm. Frequency 212C for example corresponds to a 0.95-μm free-space wavelength. Filter 236 is for example a narrow-band optical bandpass filter having a center transmission frequency equal to frequency 212C. Modulation frequencies 212F are for example between 50 kHz and 500 kHz. Optical signals 212 may be modulated with one or more modulation methods known in the art, which include amplitude modulation, frequency modulation, spread-spectrum, and random one-time code modulation.

Receiver 230 includes a plurality of channels 231. Each channel 231 includes an optical mask 234, a photodetector 233, channel electronics 232, and optionally a lens 235. Each optical mask 234 is between its respective photodetector 233 and emitter 211 such that optical signals 212 propagate through an optical mask 234 before being detected by a photodetector 233 therebehind. Two or more optical masks 234(1-M) may be distinct optical elements. Alternatively, two or more optical masks 234(1-M) may correspond to a different region of a single optical element that covers two or more respective photodetectors 233.

In an embodiment, each photodetector 233 is a single-pixel photodetector, for example a photodiode such as a silicon PIN diode that has, for example, a temporal cut-off frequency of 20 MHz. In another embodiment, photodetectors 233 are implemented in a pixel array such that each photodetectors 233 is a different pixel of the pixel array. The pixel array is, for example, a complementary metal-oxide-semiconductor (CMOS) image sensor or a charge-coupled device (CCD) image sensor.

Channels 231 may be arranged in any spatial configuration within receiver 230. In one embodiment, channels 231 are arranged along a line. In another embodiment, channels 231 are arranged within a plane but not all lie on the same line, such that channels 231 define a plane. For example, channels 231 are arranged in a two-dimensional array.

Each optical mask 234(1-M) is mutually distinct, such that any two optical mask 234(m) of channel 231(m) differs from optical mask 234(n) of channel 231(n), where m≠n. Without departing from the scope hereof, receiver 230 may also include, in addition to channels 231(1-M), additional channels 231 having an optical mask 234 identical to an optical mask 234 of a channel 231(1-M), Optical masks 234 may impose a respective signal modification of incident optical signals 212. The signal modification is at least one of a change in phase, amplitude, or polarization, and is for example functionally or numerically representable as a mask property 234P optionally stored in non-volatile memory 244. An optical mask is for example an optical element with a spatially-varying transmissivity described by a spatially-varying transmission function, which is an example of a mask property 234P stored in non-volatile memory 244. Mask property 234P is, for example, a look-up table representing the transmission function. Each optical mask 234 modifies the optical signal 212 transmitted therethrough to photodetector 233 and hence, with the exception of a phase-only mask, also modifies frequency-domain amplitude 212A corresponding to optical signal 212.

Optical signals 212(1-N) are incident on channels 231 at respective location angles 213(1-N), illustrated in FIG. 2 as a single angle for clarity of illustration. Each location angles 213 is an example of location angle 113. When included in a channel 231(i), where i∈{1, 2, . . . , M}, lens 235 is between the channel's photodetector 233(i) and an emitter 211(0 such that lens 235 maps angle 213 to an image location 291 on photodetector 233(i) upon which optical signal 212 is incident.

Location angle 213 is for example a chief-ray angle (CRA) of a ray (the chief ray) incident on lens 235. Lens 235 maps angle 213 to an image location 291 according to a characteristic CRA function, which may be stored in non-volatile memory 244 as CRA mapping 235M. CRA mapping 235M is for example a lookup table of chief-ray angles and corresponding image locations 291. CRA mapping 235M may also include properties of lens 235 such as its focal length and distance from optical mask 234.

Each channel 231 has a respective channel field of view ("channel-FOV") by virtue of the size of its photodetector and, when included, the relative aperture (f-number) of lens 235. In an embodiment, channel-FOVs of three or more channels 231 overlap such that at least three channels 231 receive optical signal 212 from a same emitter 211.

Each optical mask 234 transmits one or more optical signals 212(1-N) to photodetector 233 as a modified optical signal 212M, which in turn generates a photocurrent signal 233C received by channel electronics 232. For example, photodetectors 233 of channel 231(1) generates photocurrent signal 233C(1).

Channel electronics 232 may include circuitry capable of performing one or more of the following operations on photocurrent signal 233C: analog-to-digital conversion, low-pass filtering, and a demodulation. For example, channel electronics 232 includes low-pass filter circuitry that also functions as an analog demodulator. In another example, channel electronics 232 includes a low-pass filter, an analog-to-digital convertor and a digital demodulator.

In an embodiment, channel electronics 232 of one or more channels 231 is capable of demodulating photocurrent signal 233C to recover, if present, more than one modulation frequency 212F. For example, within a demodulation period T, channel electronics 232 demodulates photocurrent signal 233C at demodulation frequency equal to one of 212F(1-$N_1$) for a duration of T/$N_1$, where 1<$N_1$≤N. In an embodiment, one or more channels 231 has dedicated channel electronics 232 corresponding to a single modulation frequency 212F.

Channel electronics 232 of each channel 231(1-M) outputs a respective channel signal 231S(1-M) to a memory 242 communicatively coupled to at least one of signal processor 240 and non-volatile memory 244. Each channel signal 231S(1-M) includes, for example, a single modulation frequency amplitude 212A(k) transmitted by optical mask 234(1-M) and corresponding to emitter 211(k), where k∈{1, 2, . . . , N}. Memory 242 is for example volatile memory. Alternatively, memory 242 is non-volatile memory and may be part of non-volatile memory 244.

Signal processor 240 may include circuitry configured to and capable of performing one or more of the following operations on photocurrent signal 233C: analog-to-digital conversion, low-pass filtering, and a demodulation. For example, signal processor 240 and channel electronics 232 are complementary, such that at least one of them performs analog-to-digital conversion, low-pass filtering, and a demodulation on the respective signals they receive.

In one embodiment, signal processor 240 is integrated with receiver 230. For example, signal processor 240 and receiver 230 may be located on the same circuit board. Signal processor 240 may be integrated into a channel 231, which then functions as a master with other channels 231 being slaves. In another embodiment, signal processor 240 is separate from receiver 230. For example, signal processor 240 and receiver 230 share an enclosure, or signal processor 240 is located on a separate computer at a distance away from receiver 230. Angular localization system 200 may include more than one receiver 230, which may be communicatively coupled and independently positionable with respect to signal processor 240, memory 242, and non-volatile memory 244.

Non-volatile memory 244 stores software 250 that includes machine-readable instructions. Signal processor is communicatively coupled to non-volatile memory 244 and, when executing the machine-readable instructions stored therein, performs functions of angular localization system 200 as described herein. Software 250 includes a focused-spot-location estimator 252 and a position-to-angle converter 254.

In an embodiment, angular localization system 200 measures location angles 213(1-N) corresponding to respective emitters 211(1-N), which may be stored in memory 242 as measured location angles 213M(1-N). Measured location angles 213M(1-N) correspond to a respective location angle 213(1-N). Angular localization may be configured to output localization data 209, such as angles 213M, to a controller 260, via wired or wireless communication. Controller 260 may be remotely located such that it receives localization data 209 via a computer network 262, which is for example an intranet or the Internet. Angular localization system 200 may also be configured to receive instructions 264 from controller 260 and transmit them, via a control transmitter 266, to a receiver 217 on an object that also includes an emitter 211. For example, emitter 211(N) may include receiver 217, and is an example of emitter 111(1) on vehicle 184. Alternatively a receiver 217 need not be integrated (co-packaged) with an emitter 211, such that an object such as vehicle 184 may include a receiver 217 and emitter 211 that are independently positionable. Control transmitter 266 and receiver 217 are IEEE 802.11-compliant devices, for example.

Figure 3:
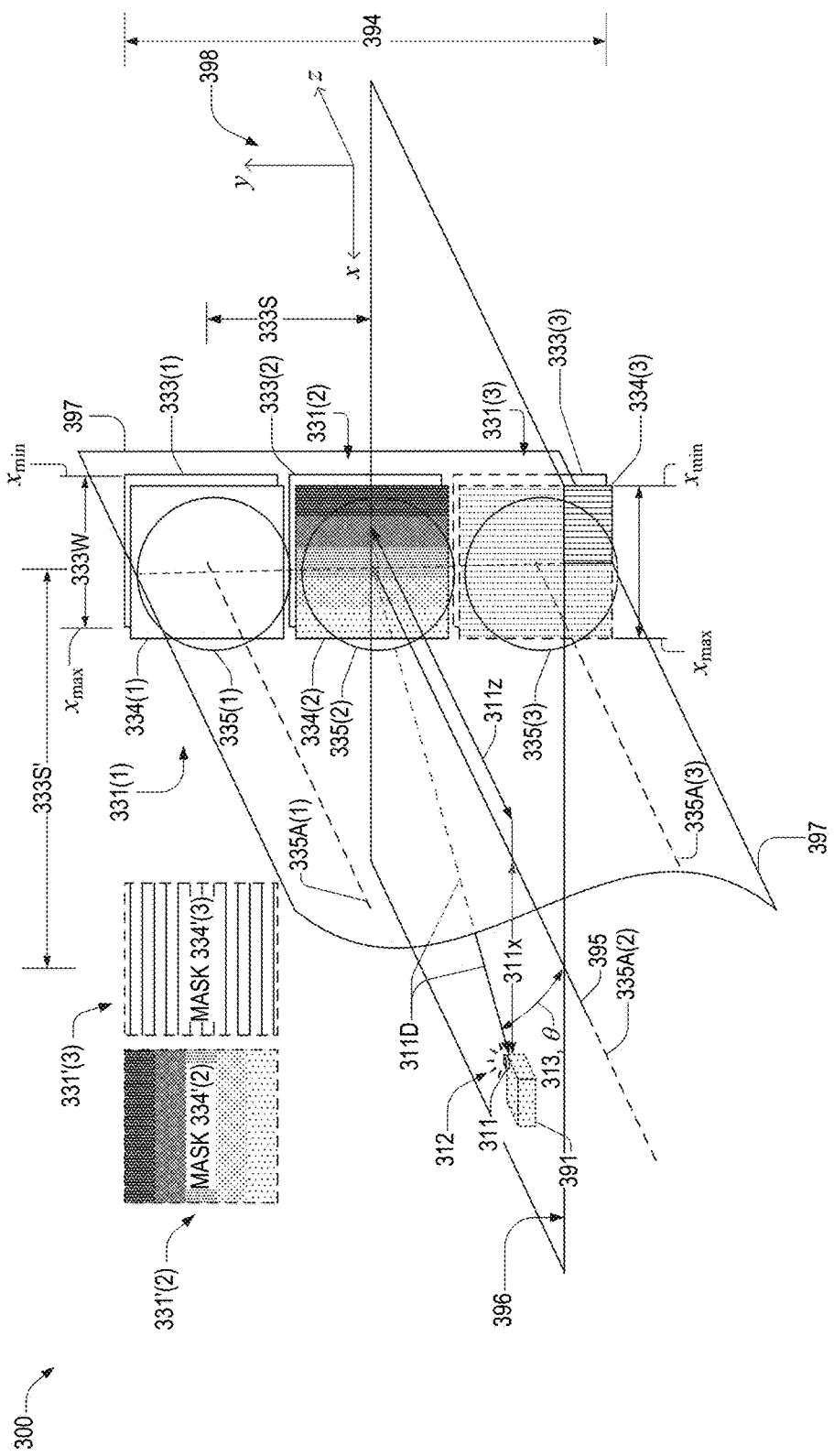
FIG. 3 is a perspective view of an angular localization system, which is an example of the angular localization system of FIG. 2.
Figure 4:
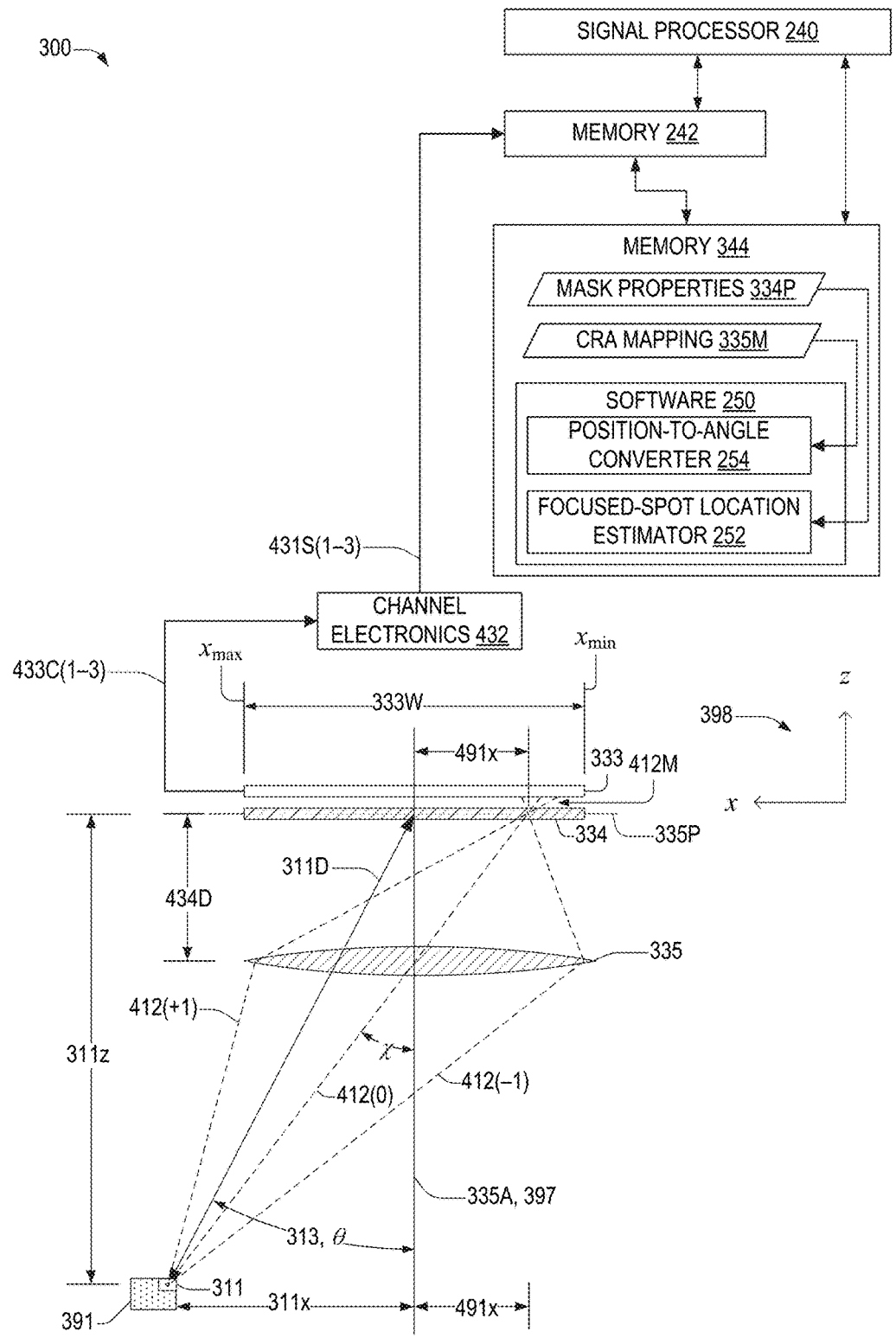
FIG. 4 is a cross-sectional view of the angular localization system of FIG. 3.

FIG. 3 is a perspective view and FIG. 4 is a cross-sectional view of an angular localization system 300. FIGS. 3 and 4 are best viewed together in the following description. FIG. 3 includes a coordinate system 398 that has form an x-y plane, an x-z plane, and a y-z plane. Herein, references to x, y, and z directions (or axes) and planes formed thereof are of coordinate system 398, unless otherwise specified. Angular localization system 300 is an example of angular localization system 200 and includes channels 331 (1-3), channel electronics 432, signal processor 240, memory 242, and memory 344.

Channels 331(1-3) are each examples of channels 231 and include photodetectors 333(1-3), optical masks 334(1-3), and lenses 335(1-3), respectively. Photodetectors 333, optical masks 334, and lenses 335 are examples of photodetectors 233, optical masks 234 and lenses 235, respectively. Channel electronics 432 is an example of channel electronics 232. Memory 344 includes mask properties 334P of masks 334 and CRA mapping 335M of lenses 335. Mask properties 334P and CRA mapping 335M are examples of mask properties 234P and CRA mapping 235M, respectively.

The relative positions channels 331 may change without affecting the functionality of angular localization system 300. For example, channel 331(1) may be between channels 331(2,3), or channel 331(3) may be between channels 331(1,2).

Optical masks 334(1-3) span a region in the x-direction between $x_{min}$ and $x_{max}$, where distance ($x_{max}-x_{min}$) is, for example, equal to a width 333W of each photodetector 333, which may also span the region. Each optical mask 334 is in a plane parallel to the x-y plane that is perpendicular to a plane 396, which is parallel to the x-z plane. Lenses 335 are in front of optical masks 334(1-3) and have respective optical axes 335A(1-3) that are coplanar in a plane 397, which is orthogonal to plane 396. The cross-sectional view of FIG. 3 represents a cross-sectional view of angular localization system 300 in plane 396, or in a plane parallel to plane 396 that includes one of optical axes 335A(1) and 335A(3).

Optical masks 334(1-3) are each part of a respective channel 331(1-3) of angular localization system 300 that have respective fields of view that overlap in a region that includes an object 391. Object 391 has thereon an emitter 311 that intersects plane 396. Emitter 311 is an example of emitter 211. Line 395 is in plane 396 and is perpendicular to the x-y plane. Line 395 is for example collinear with an optical axis 335A of lens 335 in front of optical mask 334(2). Channels 331 span a range 394 of y-coordinate values. Object 391 and emitter 311 are shown within this range for illustrative purposes only, and may be outside of this range without departing from the scope hereof.

In plane 396, emitter 311 is located at a distance 311D from photodetector 333(2), a distance 311z from a plane that includes photodetectors 333, and a distance 311x from plane 397. Distances 311x and 311z correspond to emitter 211 having a location angle 313 with respect to plane 397, or equivalently with respect to optical axis 335A(2). Location angle 313 is an example of angle 213, and herein is also referred to as location angle θ.

Channels 331(1-3) are arranged collinearly in the y-direction. For example, channels 331(1-3) are center-aligned in the x-direction such that each optical axis 335A(1-3) is in plane 397. Such center alignment prevents parallax-induced errors in determining angle 313. For example, if channels 331 were translated along the negative y-direction such that optical axis 335A(1) of channel 331(1) were in plane 397, the angle between emitter 311 and optical axis 335A(1) equals aforementioned location angle 313 only if channels 331(1-2) are center-aligned in the x-direction.

Photodetectors 333 are separated by a center-to-center distance 333S along the y direction. Distance 333S is for example between one millimeter and ten centimeters, which is much less than a typical distance 311D.

Lenses 335 have a focal length f and are located a distance 434D from respective optical masks 334. Distance 434D for example equals focal length f. Emitter 211 emits optical signal 312, which is an example of optical signal 212. Optical signal 312 includes a chief ray 412(0) and marginal rays 412(±1), which lens 335 images onto an image plane 335P at an image location 491x from plane 397. Image plane 335P is for example within optical mask 334, at a front surface or back surface thereof, or between optical mask 334 and photodetector 333. Optical mask transmits optical signal 312 as a modified optical signal 412M, which is an example of modified optical signal 212M.

Chief-ray 412(0) intersects optical axis 335A at chief-ray angle (CRA) χ such that image location 491x equals f tan(χ) when distance 434D equals focal length f. Image location 491x is an example of image location 291, FIG. 2. In practice, chief-ray angle χ is approximately equal to location angle 313 (θ), which can be seen in FIG. 4. Location angle θ satisfies tan $$\theta = \frac{411x}{411z},$$

while chief-ray angle χ satisfies tan $$x = \frac{411x + 491x}{411z}.$$

In practice, distance 311x is far greater than image location 491x, such that χ≅θ. Detector 333 may be a single-pixel detector for example has width 333W between one-half millimeter and ten millimeters such that image location 491x is less than five millimeters. By contrast, distance 311x may be on the order of meters.

Chief-ray angle χ satisfies CRA mapping 335M relating chief-ray angle χ and image location 491x. When lens 335 is a thin lens, CRA mapping 335M is tan $$x = \frac{491x}{434D}.$$

Distance 434D is known, and hence determining image location 491x enables determination of chief-ray angle χ, and hence location angle θ of emitter 311 and object 391.

Without departing from the scope hereof, chief-ray angle χ and image location 491x may satisfy a relation other than tan $$x = \frac{491x}{434D},$$

for example, when lens 335 is a compound lens. In such a case, a functional relationship or a numerical one-to-one mapping between chief-ray angle χ and image location 491x may be determined using lens design software known in the art and stored as CRA mapping 335M. For example, lenses 335 are image-side telecentric lenses, which decreases the spatial dimensions, such as width 333W, of optical masks 334 and photodetectors 333 sufficient for imaged rays 412 to reach optical masks 334 and photodetectors 333.

Figure 5:
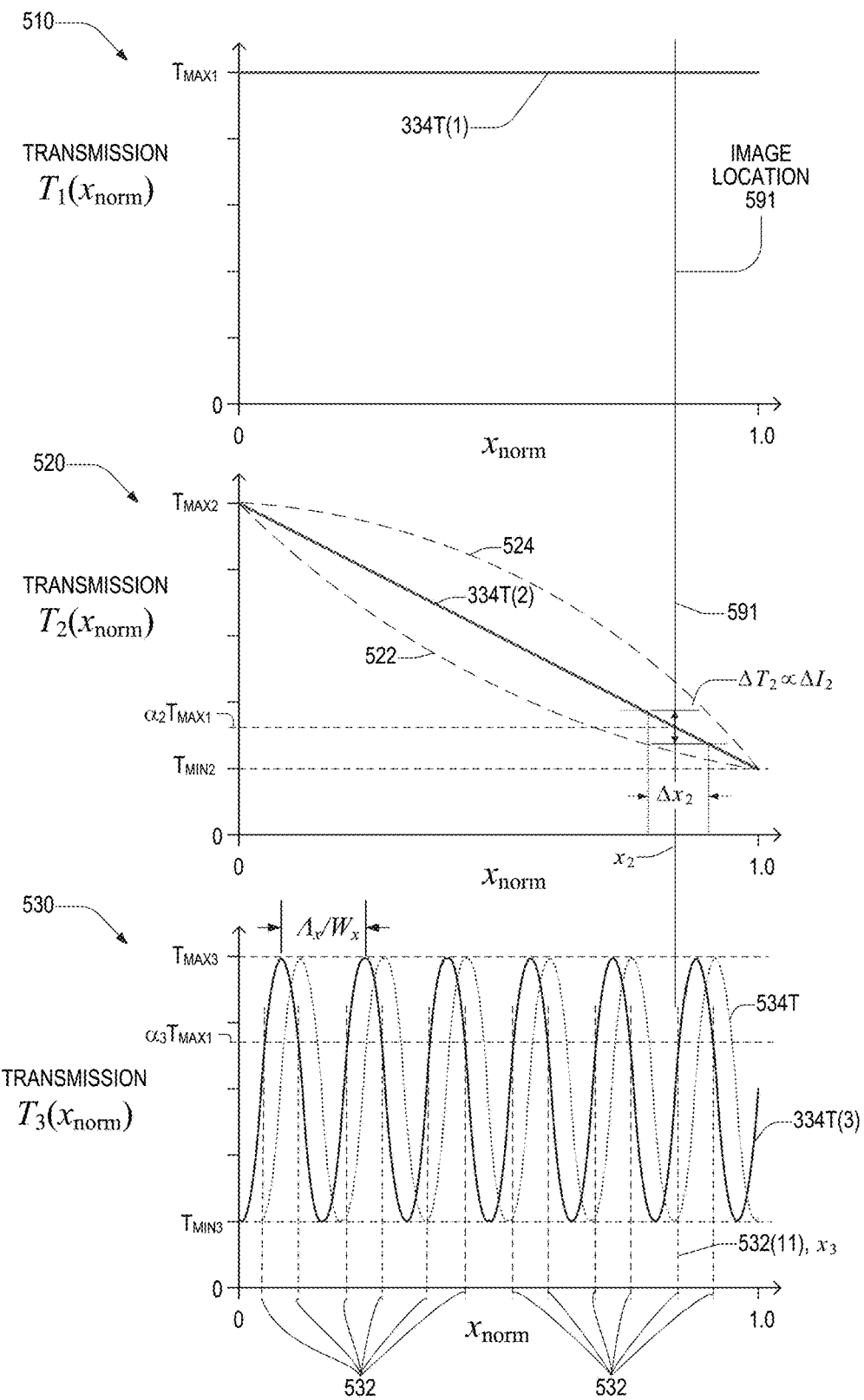
FIG. 5 includes plots of exemplary transmission functions of optical masks of the angular localization system of FIG. 3.

FIG. 5 includes plots 510, 520, and 530 showing respective exemplary transmission functions 334T(1-3) of optical masks 334(1-3). Optical masks 334 are for example formed of molded plastic. Optical masks 334 may include an absorbing dye at predetermined locations such that their transmission functions 334T apply at a wavelength corresponding to carrier frequency 202C. The absorbing dye absorbs near-infrared light, for example, and may have a peak absorption at 950±20 nm.

Transmission functions 334T(1-3) are each a function of a normalized image location $x_{norm}$ in a direction parallel to the x-dimension. Herein, transmission functions 334T(1-3) are also referred to as $T_1(x_{norm})$, $T_2(x_{norm})$, and $T_3(x_{norm})$ respectively. Transmission functions 334T(1-3) are independent of y, such that any spatial variation is entirely along the x direction. Normalized image location $x_{norm}$ is between $x_{min}$ and $x_{max}$ of FIGS. 3 and 4, for example.

Transmission function 334T(1) has a uniform transmission, in both directions x and y, equal to $T_{max1}$, which is for example unity or 0.99. Transmission function 334T(2) has a maximum $T_{max2} \leq T_{max1}$ and a minimum $T_{min2} > 0$. Transmission function 334T(3) has a maximum $T_{max3} \leq T_{max1}$ and a minimum $T_{min3} > 0$. Minimum transmissions $T_{min2}$ and $T_{min3}$ are for example 0.20. Transmission functions 334T(1-3) are each examples of a mask property 234P that may be stored in memory 344, as a lookup table for example.

Normalized image location $x_{norm}$ is normalized to a width of optical mask 334 along the x-dimension. In response to modified optical signal 412M, photodetectors 333(1-3) generate a respective photocurrent signal 433C(1-3), which are each examples of photocurrent signal 233C, from which channel electronics 432 generates respective channel signals 431S(1-3) (FIG. 4). Channel signals 431S(1-3) are examples of channel signals 231S. The amplitude of channel signals 431S(1-3) may correspond to a single modulation frequency amplitude 212A, e.g., a frequency of amplitude modulation, of modified optical signal 412M that distinguishes signals from emitter 311 from ambient light incident on channels 331. Alternatively, amplitudes of channel signals 431S(1-3) may be proportional to respective photocurrent signals 433C(1-3).

Herein, channel signals 431S(1-3) are also denoted by $I_1$, $I_2$, and $I_3$, respectively. Modified optical signal 412M has an optical power $P_0$, which can be considered uniform across photodetectors 333 because distance 333S between adjacent photodetectors 333 is small compared to distance 311D.

Channel signals $I_1$, $I_2$, and $I_3$ are proportional to the product of optical power $P_0$ and their respective transmission functions $T_1$, $T_2$, and $T_3$ (m=1, 2, or 3), as shown in Equation 1.

$$I_m \propto T_m P_0 \qquad \text{Eq. (1)}$$

Plots 510, 520, and 530 each denote an normalized image location 591, which corresponds to image location 491x of FIG. 5. The value of image location 591, that is, a value of $x_{norm}$ between zero and one, may be determined given known transmission functions $T_1$, $T_2$, and $T_3$ Channel 331(1) generates channel signal $I_1$ generated by photodetector 333(1) that is independent of image location 591 because $T_1(x_{norm}) = T_{max}$. Hence, on its own, the response of photodetector 333(1), which is channel signal $I_1$, provides no information about image location 491x, and accordingly no information about location angle 313.

Channel signal $I_2$ generated by channel 331(2) provides a course estimate $x_2$ of image location 491x because the functional form $T_2(x_{norm})$ is known. In the example of plot 500(2), transmission function 334T(2) ($T_2(x_{norm})$) is represented by Equation 2, where $T_{max2}$ and $T_{min2}$ of optical mask 334(2) are known.

$$T_2(x_{norm}) = T_{max2} - (T_{max2} - T_{min2}) x_{norm} \qquad \text{Eq. (2)}$$

Measured channel signals $I_1$ and $I_2$ provide a value of a ratio $\alpha_2 = I_2/I_1$. Ratio $\alpha_2$ also equals $T_2/T_1$ because $I_2 \propto T_2 P_0$, per Eq. 1. Hence, in channel 331(2) image location 591 corresponds to a transmission value of $T_2(x_2) = \alpha_2 T_{max1}$. Accordingly, $\alpha_2 T_1$, or equivalently $\alpha_2 T_{max1}$, may be substituted for $T_2(x_{norm})$ in Eq. 2, such that a first estimate $x_2$ of $x_{norm}$ can be determined from known quantities $T_{max1}$, $T_{max2}$, and $T_{min2}$, as shown in Equation 3. Focused-spot-location estimator 252 may determine first estimate $x_2$.

$$x_2 = \frac{T_{max2} - \alpha_2 T_{max1}}{(T_{max2} - T_{min2})} \qquad \text{Eq. (3)}$$

Transmission function 334T(2) is shown as linear in FIG. 5 and Eq. 2, but may be non-linear without departing from the scope hereof. For example, Transmission function 334T(2) may be a monotonically increasing or monotonically decreasing function of $x_{norm}$, such as curves 522 and 524. The above-mentioned examples of transmission function 334T(2) are each a one-to-one function (a.k.a. an "injective" or "strictly monotonic" function, to use mathematical terms), such that each transmission value between $T_{min}$ and $T_{max}$ corresponds to one and only one value of $x_{norm}$. A strictly monotonic function may be either strictly increasing or strictly decreasing. Mathematically, transmission function 334T(2) as shown in plot 520 is a strictly decreasing function of increasing $x_{norm}$ because it is always decreasing, rather than increasing or remaining constant. The injective or strictly monotonic property of transmission function 334T(2) enables measured photocurrent signal 433C(2) (also denoted $I_2$) to identify a one (and only one) $x_2$ value as an estimate of image location 591. Herein, an optical mask with an injective (strictly monotonic) transmission function (e.g., strictly increasing or strictly decreasing) is called a slow-varying optical mask.

The accuracy of $x_2$ depends in part on an uncertainty $\Delta I_2$ of channel signal $I_2$, as ratio $\alpha_2 = I_2/I_1$. Since ratio $\alpha_2$ also equals $T_2/T_1$, this uncertainty may be represented in plot 520. Uncertainty $\Delta I_2$ corresponds to an uncertainty $\Delta x_2$ of $x_2$, the magnitude of which is determined by slope $$\frac{dT_2}{dx_{norm}} = \frac{(T_{max2} - T_{min2})}{1} \text{ of } T_2(x_{norm}),$$

as shown in Equation 4.

$$\Delta x_2 = \frac{\Delta T_2}{(dT_2/dx_{norm})} \qquad \text{Eq. (4)}$$

Uncertainty $\Delta x_2$ can be reduced by increasing $(T_{max2} - T_{min2})$. However, as $T_{min}$ approaches zero, measurements of modified optical signal 412M so attenuated become more noisy, such that $\Delta I_2$ increases, and hence places a lower limit on uncertainty $\Delta x_2$.

Uncertainty $\Delta x_2$ may be reduced detecting optical power $P_0$ with a channel having an optical mask having a slope larger than $(T_{max2} - T_{min2})$. For example, channel 331(3) that has optical mask 334(3), which has a transmission function 334T(3), or $T_3(x_{norm})$, which in this example is periodic.

Channel signal $I_3$ generated by photodetector 333(3) provides a refined estimate $x_3$ of image location 491x because the functional form $T_3(x_{norm})$ is known. For example, $T_3(x_{norm})$ may be represented by Equation 5, where plot 520 illustrates period $\Lambda_x$ divided by $W_x$, which is photodetector width 333W. Period $\Lambda_x$ is for example X micrometers.

$$T_3(x_{norm}) = T_{min} + (T_{max} - T_{min}) \sin\left(\frac{2\pi x_{norm}}{(\Lambda_x/W_x)}\right) \qquad \text{Eq. (5)}$$

Channel signals $I_1$ and $I_3$ provide a value of a ratio $\alpha_3 = I_3/I_1$. Ratio $\alpha_3$ also equals $T_3/T_1$ because $I_3 \propto T_3 P_0$, per Eq. 1. Hence, in channel 331(3) image location 591 corresponds to a transmission value of $T_3(x_{norm}) = \alpha_3 T_{max}$, which is satisfied at several candidate locations 532, denoted by dashed vertical lines in plot 530, because, in the example of plot 530, $T_3(x_{norm})$ is a sinusoidal function. One location 532 corresponds to image location 591, which has the same value on each channel 331(1-3). Hence, the "correct" candidate location 532 is the one closest to location $x_2$ determined for channel 331(2), denoted by normalized location 532(11) in plot 530. Normalized location 532(11) may be considered a refined estimate of image location 591, and hereinafter is also referred to a refined estimate 532(11) or refined estimate $x_3$. Focused-spot-location estimator 252 may determine refined estimate 532(11).

Transmission function 334T(3) may be non-sinusoidal periodic function, such as a triangle waveform, without departing from the scope hereof. Transmission function 334T(3) may be also a non-injective and non-periodic function, such as a quasi-periodic function or a locally-periodic function, without departing from the scope hereof. $T_3(x_{norm})$ of Eq. 5 can be generalized to represent a locally periodic function by specifying that period $\Lambda_x$ is a function of $x_{norm}$, that is, $\Lambda_x = \Lambda_x(x_{norm})$.

In an embodiment, angular localization system 300 includes additional channels 331(3') with respective optical masks 334' having a respective periodic transmission function 334T(3') identical to transmission function 334T(3), except that they are shifted by a fraction of period $\Lambda_x/W_x$. Transmission function 534T illustrates such a transmission function. Localization system 300 may include channels 331(3a), 331(3b), and 331(3c) with respective transmission functions 334T(3a), 334T(3b), and 334T(3c) that are phase-shifted versions transmission function 334T(3), where the phase shifts are, for example, 60°, 120°, and 180°, respectively.

Such "phase-shifted" channels 331(3') each provide additional sets of candidate locations 532 such that refined estimate $x_3$ is determined from more candidates, which enables refined estimate $x_3$ to be closer to course estimate x2 than with fewer candidate locations 532. A second benefit of phase-shifted channels 331(3') becomes apparent when candidate locations 532 are at or near regions of transmission function 334T(3) have zero or very small slope, which results in large uncertainties as illustrated by Eq. 4. A phase-shifted transmission function 334T(3') has candidate locations in high-slope regions, and hence provide refined estimates with low uncertainty.

The forgoing describes how angular localization system may operate to determine, for emitter 311, location angle 313 in plane 396. Angular localization system 300 may also include additional channels 331'(2) and 331'(3), which enable angular localization system 300 to determine for emitter 311, a second location angle in plane 397, which is orthogonal to plane 396. Distance 333S' between channels 331'(3) and channel 331(1) is not to scale and is for example equal to distance 333S. Channels 331'(2) and 331'(3) are collinear to and in a plane parallel to channel 331(1). For example, channels 331(1), 331'(2), and 331'(3) are center-aligned along the y direction and have lenses 335 with respective optical axes that are coplanar in a plane parallel to plane 396. Channels 331'(2) and 331'(3) are equivalent to channels 331(2) and 331(3), but have respective optical masks 334'(2) and 334'(3) rotated by ninety degrees with respect to optical masks 334(2) and 334(3) such their transmission varies along the x dimension. Channels 331(1), 331'(2), and 331'(3) would enable angular localization system to determine a second angular location of emitter 311 in a plane parallel to plane 397.

Figure 6:
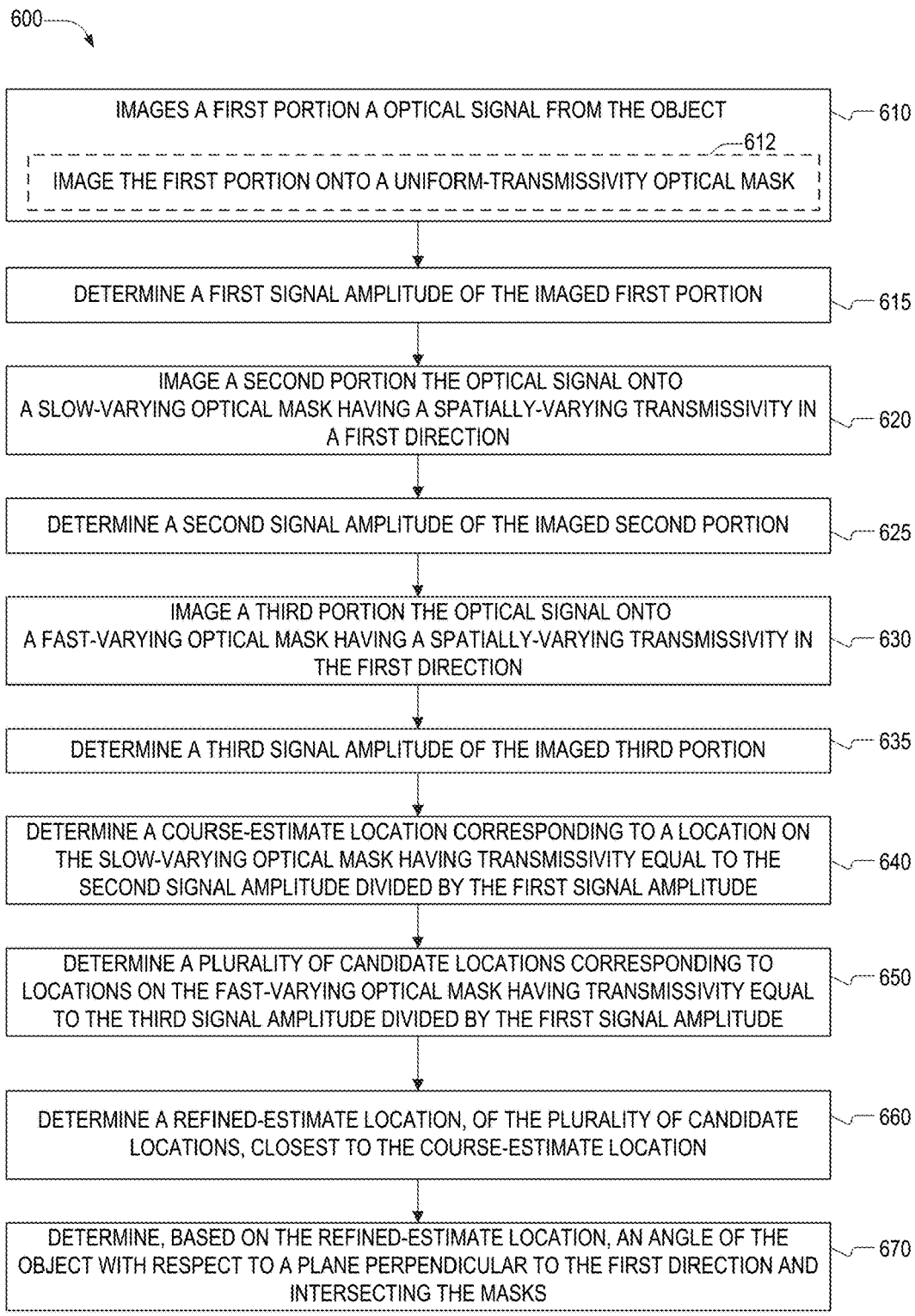
FIG. 6 is a flowchart illustrating a method for determining an angular location of an object, in an embodiment.

FIG. 6 is a flowchart illustrating a method 600 for determining a location parameter of an object. Method 600 is for example implemented by angular localization system 200.

In step 610, method 600 images a first portion of an optical signal from the object. In an example of step 630, a first portion of optical signal 312 is incident on lens 335(1), which images the first portion toward detector 333(1).

Step 610 optionally includes step 612. In step 612, method 600 images the first portion onto a uniform optical mask having a uniform transmissivity that equals or exceeds a maximum transmissivity of a second optical mask. In an example of step 612, lens 335(1), which images the first portion onto optical mask 334(1).

In step 615, method 600 determines a first signal amplitude of the imaged first portion. In an example of step 615, channel electronics 432 generates channel signal 431S(1) from photocurrent signal 433C, where the amplitude of channel signal 431S(1) is an example of the first signal amplitude.

In step 620, method 600 images a second portion of the optical signal onto a slow-varying optical mask having a strictly monotonic transmissivity $T_2(x)$, in an x-range of a spatial dimension x. In an example of step 620, a second portion of optical signal 312 is incident on lens 335(2), which images the second portion onto optical mask 334(2).

In step 625, method 600 determines a second signal amplitude of the imaged second portion transmitted through the slow-varying optical mask. In an example of step 625, channel electronics 432 generates channel signal 431S(2) from photocurrent signal 433C, where the amplitude of channel signal 431S(2) is an example of the second signal amplitude.

In step 630, method 600 images a third portion of the optical signal onto a fast-varying optical mask having a spatially-varying transmissivity $T_3(x)$ having a same value at more than one value of x in the x-range. In an example of step 630, a third portion of optical signal 312 is incident on lens 335(3), which images the third portion onto optical mask 334(3).

In step 635, method 600 determines a third signal amplitude of the imaged third portion transmitted through the fast-varying optical mask. In an example of step 635, channel electronics 432 generates channel signal 431S(3) from photocurrent signal 433C, where the amplitude of channel signal 431S(3) is an example of the third signal amplitude.

In step 640, method 600 determines a course-estimate location $x_2$ in the x-range and corresponding to a location on the slow-varying optical mask having transmissivity equal to the second signal amplitude divided by the first signal amplitude. In an example of step 640, focused-spot-location estimator 252 determines location $x_2$ (plot 520, FIG. 5) on optical mask 334(2) (FIG. 3) using mask properties 334P.

In step 650, method 600 determines a plurality of candidate locations $\{x_{3,1}, x_{3,2}, x_{3,3}, \ldots, x_{3,n}\}$ in the x-range and corresponding to locations on the fast-varying optical mask having transmissivity equal to the third signal amplitude divided by the first signal amplitude. In an example of step 650, focused-spot-location estimator 252 determines candidate locations 532 (plot 530, FIG. 5) on optical mask 334(3) (FIG. 3).

In step 660, method 600 determines a refined-estimate location, of the plurality of candidate locations, closest to the course-estimate location $x_2$. In an example of step 660, focused-spot-location estimator 252 determines, from normalized locations 532, normalized location 532(11) as the closest to course-estimate location $x_2$ (plot 520, FIG. 5).

In step 670, method 600 determines, based on the refined-estimate location, an angle of the object with respect to a plane perpendicular to the spatial dimension x and intersecting the masks. In an example of step 670, position-to-angle-converter 254 determines location angle 313 of object 391 with respect to plane 397, which is perpendicular to the x-y plane.

Figure 7:
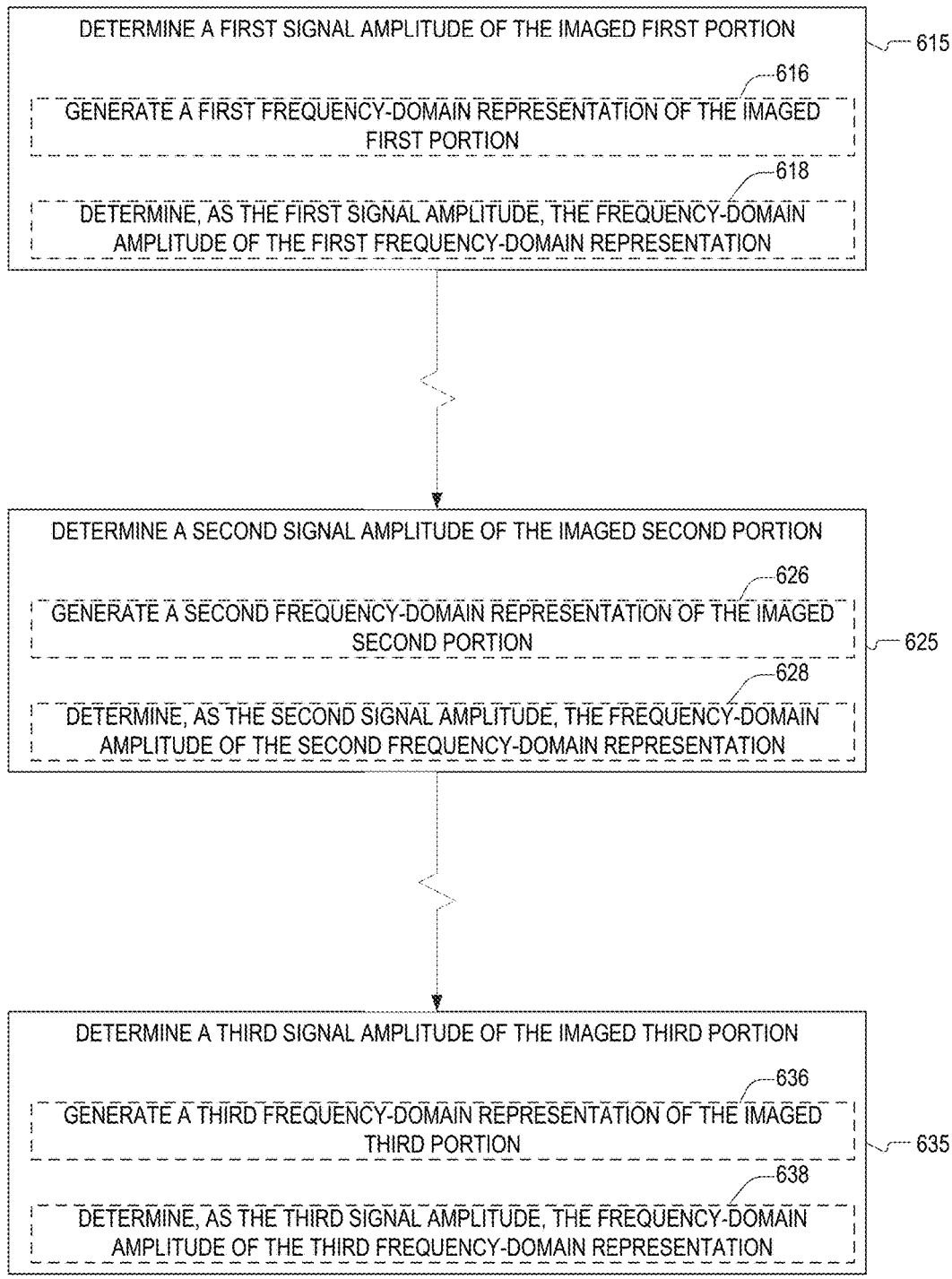
FIG. 7 is a flowchart illustrating optional steps of the method of FIG. 6, in an embodiment.

The optical signal introduced in step 610 may be a modulated optical signal a modulation frequency and a corresponding frequency-domain amplitude. In such an instance, method steps 615, 625, and 635 may include (i) steps 616, 626, and 636, respectively, and steps 618, 628, and 638, respectively, as illustrated in FIG. 7. In step 616, method 600 generates a first frequency-domain representation of the imaged first portion. In step 618, method 600 determines, as the first signal amplitude, the frequency-domain amplitude of the first frequency-domain representation. In step 626, method 600 generates a second frequency-domain representation of the imaged second portion. In step 628, method 600 determines, as the second signal amplitude, the frequency-domain amplitude of the second frequency-domain representation. In step 636, method 600 generates a third frequency-domain representation of the imaged first portion. In step 638, method 600 determines, as the third signal amplitude, the frequency-domain amplitude of the third frequency-domain representation.

FIGS. 8A-8E describe exemplary uses of localization system 200 and method 600. Each transmitter 811 of FIGS. 8A-8E is an example of an emitter 211. Vehicle 184 of FIG. 8A has a transmitter 811(1) above its driver's seat and a transmitter 811(2) on pallet 884, which enables both location and state of the lift (and pallet 884) to be estimated, displayed and potentially controlled. Bicycle 820 of FIG. 8B has a transmitter 811(3) enables it to be localized and potentially controlled.

Figure 8A:
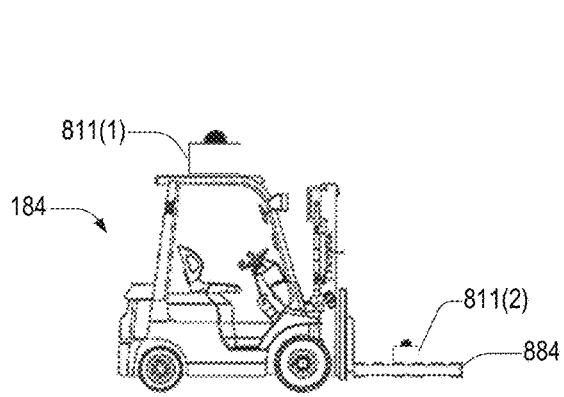
FIGS. 8A-8E describe examples of exemplary uses of the localization system of FIG. 2 and the method of FIG. 6.
Figure 8B:
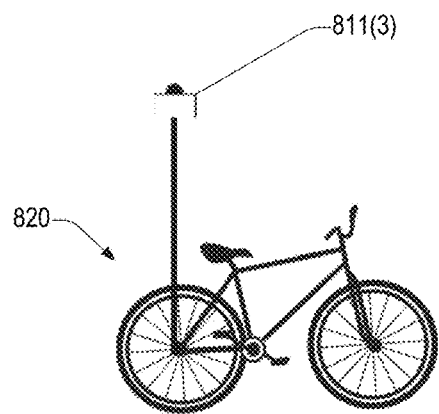
Figure 8C:
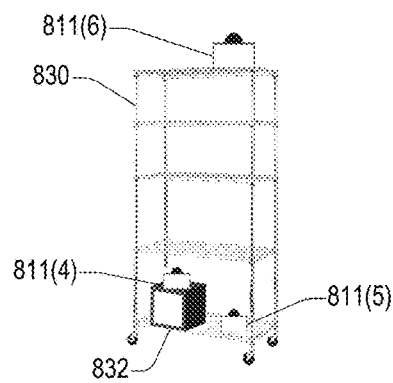
Figure 8D:
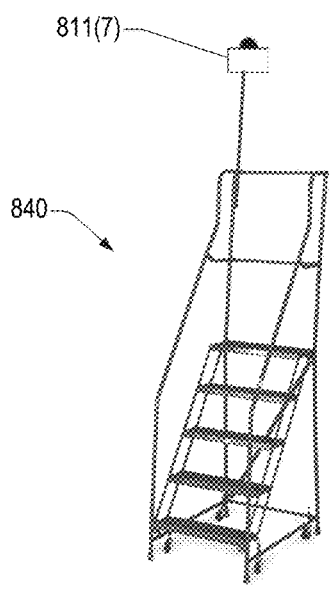

Mobile rack 830 of FIG. 8C may include a range of trackable objects, such as object 832 via transmitter 811(4). The location of specific regions of rack 830 may be estimated by localizing transmitters 811(5) and 811(6). Transmitter 811(5) may serve an additional role by virtue of its being on the bottom shelf of rack 830. When the rack 830 is empty, transmitter 811(5) becomes visible to localization system 200, enabling not only a location estimate but the knowledge that rack 830 is empty. Mobile stair 840 of FIG. 8D is similarly trackable via transmitter 811(7).

In an exemplary use case of localization system 200 that includes a transmitter 811, transmitter 811 may be placed in locations that are not normally visible, such as the sole of footwear or hidden beneath high value items that should not be moved, or indicate potential issues in the environment. Transmitters 811 visible from soles of shoes may indicate a person in a prone position, possibly from an accident. A transmitter 811 may also indicate a missing item when an obstructed and transmitter 811 is suddenly revealed when the obstruction is removed, enabling real-time theft detection or notification of abrupt changes in an otherwise static environment.

Figure 8E:
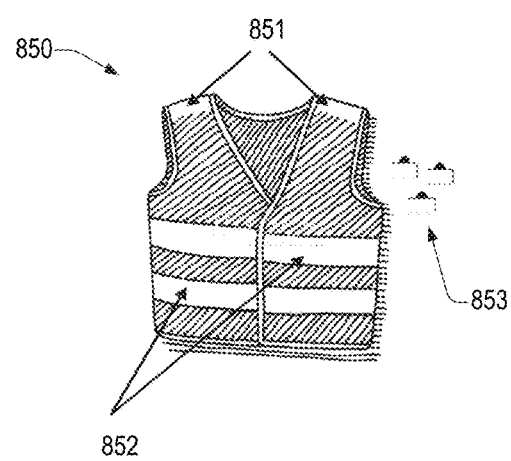

Vest 850 of FIG. 8E is a specialized vest wearable by workers, visitors and operators at a facility or job site. Vest 850 is specialized in that it has transmitting regions 851, 852 either on or within the material of the vest. Transmitting regions 851 and 852 are examples of emitters 211. These vests may incorporate wearable electronics to make the transmitter systems less bulky, more acceptable to wearers and potentially less cost and more technically effective as transmitters. Transmitting region 851 may transmit light generally upward for identification and localization. Transmitting region 852 may transmit light generally horizontally when worn in the traditional manner, but also vertically when the wearer is sitting, lying down, etc. A wearer of vest 850 may also carry additional temporary transmitters 853 to be placed on items of interest for tracking in a temporary fashion, for example to track the passage of a high value item from shelf to shipping. In such a case, one temporary transmitter 853 would be activated by the user and logged into the infrastructure by the receivers to begin tracking. A selected temporary transmitter 853 can be removed from the high-value item prior to shipping and recirculated into a pool of temporary transmitters 853.

Figure 9:
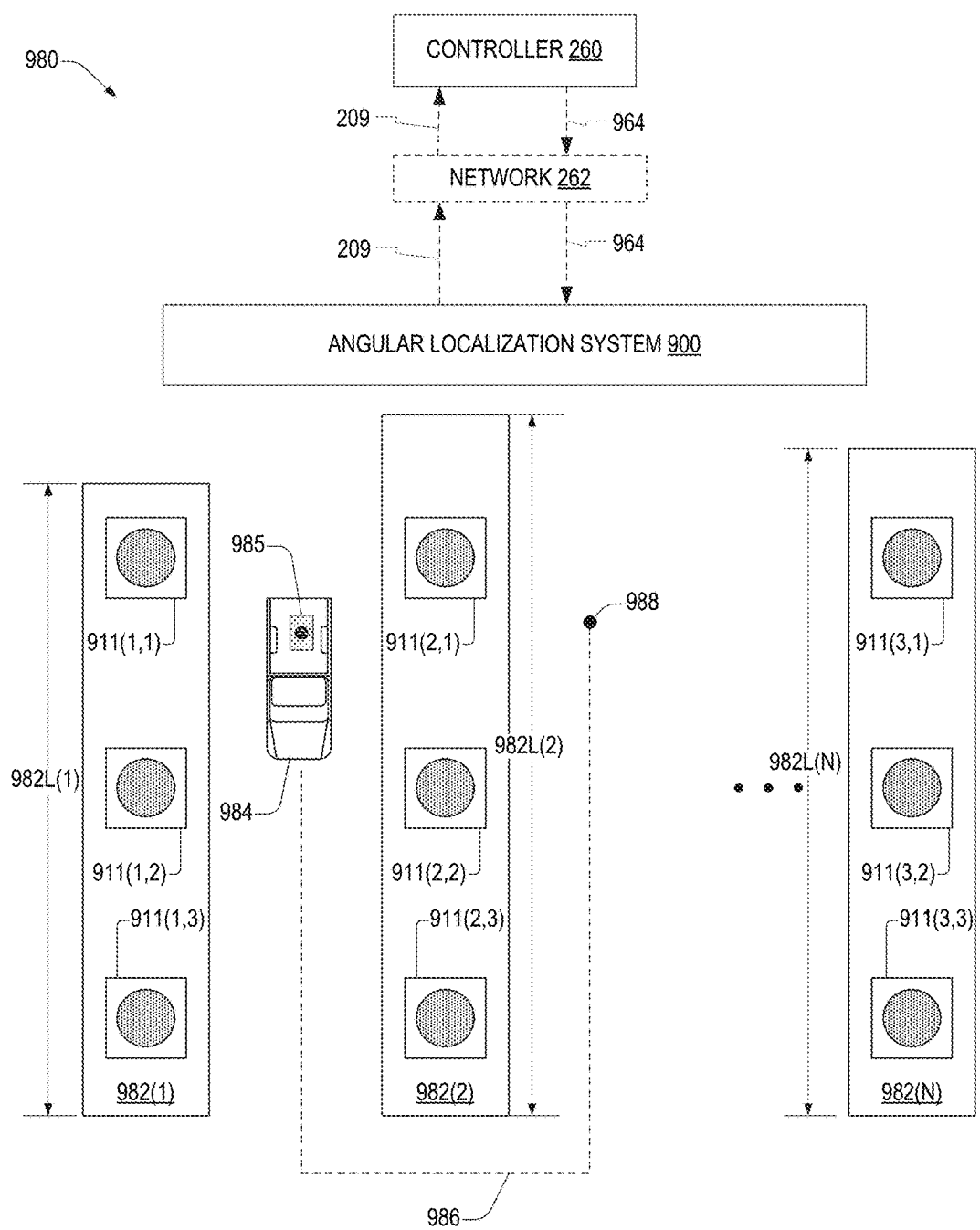
FIG. 9 illustrates a first exemplary use environment for the angular localization system of FIG. 2, in an embodiment.

FIG. 9 illustrates an exemplary use environment 980 for an angular localization system 900 communicatively coupled to controller 260. Angular localization system 900 is an example of angular localization system 200. Environment 980 includes fixed landmarks 982(1-N), which are similar to fixed shelves 182 of FIG. 1. Each landmark 982 has one or more Mutually distinct transmitters 911 configured to emit a distinct optical signal 912. Transmitters 911 and optical signal 912 are examples of emitters 211 and optical signal 212 respectively.

Quantity N may range from less than ten to greater than a thousand. Landmarks 982 have respective lengths 982L(1-N), each of which may be less than ten meters long to thousands of meters long. While FIG. 9 illustrates landmarks 982 as being mutually parallel, landmarks 982 may have other relative orientations. For example, their relative orientation can be simple as a grid or a complex as the streets of a medieval city.

Transmitters 911 function to identify regions and locations of the fixed landmarks 982. A landmark 982 may have any number of transmitters 911, for example, ranging from less than ten to more than one thousand, depending on the application.

Application environment 980 includes a mobile object 984 being directed to a location 988 along a path 986 by angular localization system 900 and controller 260. Object 984 has thereon a transceiver 985, which is an example of an emitter 211 that includes receiver 217. Transceiver 985 is for example communicatively coupled to object 984 such that controller 260 may remotely operate object 984 via transceiver 985. Controller 260 executes processing and control to calculate a desired path 986 and command mobile object 984 travel path 986, via instructions 964. Communication to object 984 can be performed optically or wirelessly through transceiver 985. Angular localization system 900 estimates position, velocity and other relevant information about object 984, such as potential obstructions while object 984 travels path 986. When object 984 arrives at location 988, controller 260 may instruct object 984, via angular localization system 900, to perform a specialized task, such as picking up parts, depositing parts to a fixed landmark 982, or reading a barcode.

Figure 10:
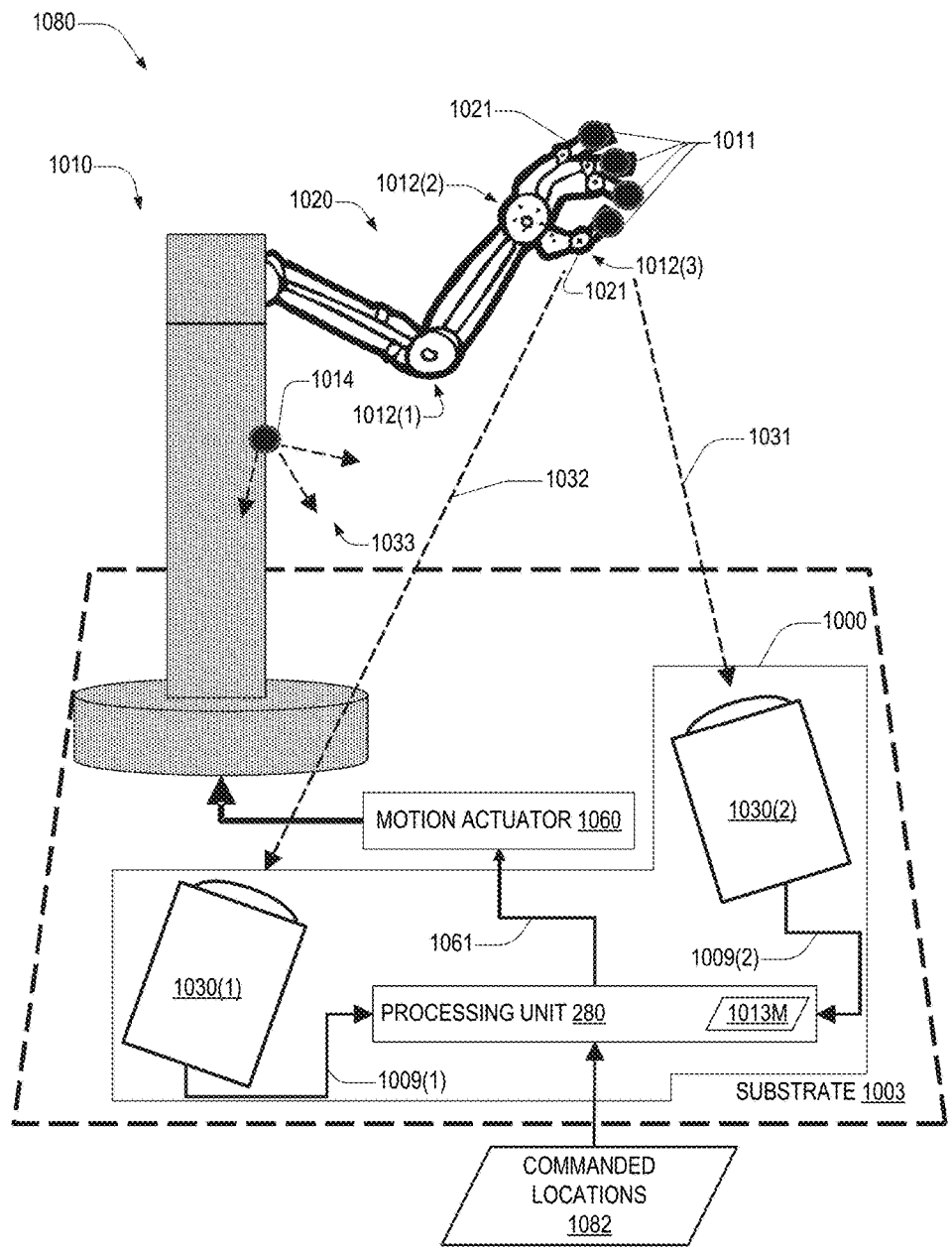
FIG. 10 illustrates a second exemplary use environment for the angular localization system of FIG. 2, in an embodiment.

FIG. 10 depicts a system 1080 that may be used in conjunction with mobile object 984 of FIG. 9. System 1080 can also be mounted on a fixed system. System 1080 includes a substrate 1003 that has a robotic arm 1010 and an angular localization system 1000 mounted thereon. Angular localization system 1000 is an example of angular localization system 200 and includes angular localization receivers 1030(1) and 1030(2). Angular localization receivers 1030(1) and 1030(2) are each examples of receiver 230.

Robotic arm 1010 includes a plurality of actuators 1012(1-3). Typically, multiple actuators are used to control mechanical motion and result in what is called open-loop control. Open-loop control does not allow the system to automatically compensate for permanent or temporary errors in the expected position of one or more actuators. Open-loop control also means that picking and placing objects in a fashion as efficient as a human is often difficult to impossible, especially if the robot needs to be relatively low cost. A human's vision coordinated to her hand is a form of closed-loop control. System 1080 in essence enables closed-loop control of a low-cost robot that can mimic the method humans employ to use arms and hands.

Robotic arm 1010 contains an arm 1020 with one or more actuatable parts 1021. Actuatable parts 1021 for example resemble fingers of a human hand. Alternatively, actuatable part 1021 may be a bucket attached to heavy machinery such as an excavator or a crane; for example, arm 1020 is a boom and actuatable part 1021 is hydraulic cylinder actuated by actuator 1012(1).

Mounted on actuatable parts 1021 are mutually distinct transmitters 1011 that enable precision and fast localization of each actuatable part 1021 through angular localization receivers 1030(1) and 1030(2). Localization of actuatable parts 1021 can be made relative to one or more reference points 1014. Reference points 1014 are for example transmitters 1011 and transmitters 711 of FIG. 7.

Transmitted radiation 1031 and 1032 from actuatable parts 1021 and transmitted radiation 1033 from reference point 1014 travel toward angular localization receivers 1030 (1) and 1030(2). Receivers 1030(1) and 1030(2) deliver localization information of each actuatable part 1021 and reference point 1014 to processing unit 280 via localization data 1009(1) and 1009(2), from which processing unit 280 determines localization angles 1013M, which are examples of localization angles 213M. Localization data 1009(1) and 1009(2) are examples of localization data 209.

Other systems that require actuatable parts 1021 to be in certain position or have certain motion, for example to pick up a complex part, are inputs for system 1080 through represented by commanded locations 1082. Processing unit 280 compares commanded locations 1082 to a location determined from measured localization angles 1013M to determine an error signal and updated location commands 1061, which are received by motion actuator 1060. By comparing commanded location with actual location, true closed-loop control of actuatable parts 1021 is possible. Position encoders on the motion actuators within robotic arm 1010 are not required. In fact, with closed-loop control motion actuators can be inexpensive and/or have motion paths unusual compared to classical robots that move rectilinearly. Motion of the arm 1020 and actuatable parts 1021 may resemble a human arm and fingers respectively. Closed-loop control would enable fast and reliable action similar to how a human's sight and brain controls the human's hands and fingers. Picking and placing complex objects is not only possible but relatively simple and low cost with angular coding for closed-loop control.

Combinations of Features

Features described above as well as those claimed below may be combined in various ways without departing from the scope hereof. The following examples illustrate some possible, non-limiting combinations:

(A1) An angular localization system for determining a location parameter of an object includes a receiver and a signal processor. The receiver includes a first channel, a second channel, and a third channel. The first channel includes (i) a first lens for imaging a first portion of an optical signal from the object and (ii) a first photodetector for converting the imaged first portion into a first electrical signal. The second channel includes (i) a second lens for imaging a second portion of the optical signal onto a slow-varying optical mask having a strictly monotonic transmissivity $T_2(x)$ in an x-range of a spatial dimension x and (ii) a second photodetector for converting the second portion, transmitted through the slow-varying optical mask, into a second electrical signal. The third channel includes (i) a third lens for imaging a third portion of the optical signal onto a fast-varying optical mask having a spatially-varying transmissivity $T_3(x)$ having a same value at more than one value of x in the x-range, and (ii) a third photodetector for converting the third portion, transmitted through the fast-varying optical mask, into a third electrical signal. The signal processor is configured to (i) determine first, second, and third signal amplitudes from the first, second, and third electrical signals, respectively, and (ii) determine the location parameter by comparing the first, second, and third signal amplitudes.

(A2) In the angular localization system denoted by (A1), the optical signal may be a modulated optical signal having a modulation frequency, in which the first, second, and third signal amplitudes being a respective first, second, and third frequency-domain amplitude, corresponding to the modulation frequency, of the first, second, and third electrical signals.

(A3) In an angular localization system denoted by one of (A1) and (A2), each of the first, second, and third channels may have a respective field of view that overlaps with a field of view of both other channels.

(A4) An angular localization system denoted by one of (A1) through (A3) may further include a uniform optical mask between the first photodetector and the first lens and having a uniform transmissivity that equals or exceeds a maximum transmissivity of the slow-varying optical mask and a maximum transmissivity of the fast-varying optical mask.

(A5) In an angular localization system denoted by one of (A1) through (A4), the signal processor may be configured to determine the location parameter by (i) determining a course-estimate location $x_2$ in the x-range and corresponding to a position on the slow-varying optical mask having transmissivity equal to the second signal amplitude divided by the first signal amplitude, (ii) determining a plurality of candidate locations $\{x_{3,1}, x_{3,2}, x_{3,3}, \ldots, x_{3,n}\}$ in the x-range and corresponding to positions on the fast-varying optical mask having transmissivity equal to the third signal amplitude divided by the first signal amplitude, (iii) determining a refined-estimate location, of the plurality of candidate locations, closest to course-estimate location $x_2$; and (iv) determining, based on the refined-estimate location, an angle of the object with respect to a plane perpendicular to the spatial dimension x and intersecting the masks.

(A6) An angular localization system denoted by one of (A1) through (A5) may further include an emitter for at least one of (i) emitting and (ii) reflecting the optical signal, the emitter being located either (a) on the object or (b) proximate the receiver and configured to direct the optical signal at least toward a reflector mounted on the object.

(A7) In an angular localization system denoted by one of (A1) through (A6), the optical signal may have a free-space wavelength between 0.75 micrometers and 2.0 micrometers.

(A8) In an angular localization system denoted by one of (A1) through (A7), the spatially-varying transmissivity $T_3(x)$ may be a periodic function of x.

(A9) In an angular localization system denoted by one of (A1) through (A8), a portion of the slow-varying mask and a portion of the fast-varying mask may be collinear along a line perpendicular to the x-dimension.

(A10) In an angular localization system denoted by one of (A1) through (A9), in which (a) the slow-varying optical mask spanning the x-range in spatial dimension x and spanning first y-range in a spatial dimension y orthogonal to spatial dimension x, and (b) the fast-varying optical mask spanning the x-range in spatial dimension x and spanning a second y-range in spatial dimension y, transmissivity $T_2(x)$ and transmissivity $T_3(x)$ may be independent of y.

(A11) In an angular localization system denoted by one of (A1) through (A10), in which spatially-varying transmissivity $T_3(x)$ is a periodic function having a period $\Lambda_x$, the receiver may further include a fourth channel. The fourth channel includes (i) a fourth lens for imaging a fourth portion of the optical signal onto a second fast-varying optical mask having a spatially-varying transmissivity $T_4(x)=T_3(x+\Delta_x)$, $\Delta_x \leq 0.5\Lambda_x$, and (ii) a fourth photodetector for converting the fourth portion, transmitted through the second fast-varying optical mask, into a fourth electrical signal. The signal processor is configured to (i) determine a fourth signal amplitude from the fourth electrical signals, and (ii) determine the location parameter by comparing the first, second, third, and fourth signal amplitudes.

(B1) A method for determining a location parameter of an object includes steps 1-10. In step 1, the method images a first portion of a modulated optical signal from the object. In step 2, the method determines a first signal amplitude of the imaged first portion. In step 3, the method images a second portion of the modulated optical signal onto a slow-varying optical mask having a strictly monotonic transmissivity $T_2(x)$, in an x-range of a spatial dimension x. In step 4, the method determines a second signal amplitude of the second portion transmitted through the slow-varying optical mask. In step 5, the method images a third portion of the modulated optical signal onto a fast-varying optical mask having a spatially-varying transmissivity $T_3(x)$ having a same value at more than one value of x in the x-range. In step 6, the method determines a third signal amplitude of the third portion transmitted through the fast-varying optical mask. In step 7, the method determines a course-estimate location $x_2$ in the x-range and corresponding to a location on the slow-varying optical mask having transmissivity equal to the second signal amplitude divided by the first signal amplitude. In step 8, the method determines a plurality of candidate locations $\{x_{3,1}, x_{3,2}, x_{3,3}, \ldots, x_{3,n}\}$ in the x-range and corresponding to locations on the fast-varying optical mask having transmissivity equal to the third signal amplitude divided by the first signal amplitude. In step 9, the method determines a refined-estimate location, of the plurality of candidate locations, closest to course-estimate location $x_2$. In step 10, the method determines, based on the refined-estimate location, an angle of the object with respect to a plane perpendicular to the spatial dimension x and intersecting the masks.

(B2) In the method denoted by (B1), the step of imaging the first portion may include imaging the first portion onto a uniform optical mask having a uniform transmissivity that equals or exceeds a maximum transmissivity of the second optical mask.

(B3) In a method denoted by one of (B1) and (B2), the optical signal the optical signal may be a modulated optical signal having a modulation frequency and a corresponding frequency-domain amplitude. The steps of determining the first, second, and third signal amplitude may further include: generating a first, second, and third frequency-domain representation of the imaged first portion, the imaged second portion, and the imaged third portion, respectively; determining, as the first, second, and third signal amplitude, the frequency-domain amplitude of the first, second, and third frequency-domain representation, respectively.

(C1) A repositionable mechanical structure includes a repositionable part, an emitter, a controller, and an actuator. The emitter is located on the repositionable part and is configured to emit an optical signal to a receiver. The controller is adapted to receive a control signal from a transmitter communicatively coupled to the receiver. The actuator is communicatively coupled to the controller and mechanically coupled to the repositionable part and is configured to actuate the repositionable part based on the control signal.

(C2) The repositionable mechanical structure denoted by (C1) may further include the receiver. The receiver includes a first channel, a second channel, and a third channel. The first channel includes (i) a first lens for imaging a first portion of an optical signal from the object, and (ii) a first photodetector for converting the imaged first portion, into a first electrical signal. The second channel includes (i) a second lens for imaging a second portion of the optical signal onto a slow-varying optical mask having a strictly monotonic transmissivity $T_2(x)$ in an x-range of a spatial dimension x, and (ii) a second photodetector for converting the second portion, transmitted through the slow-varying optical mask, into a second electrical signal. The third channel includes (i) a third lens for imaging a third portion of the optical signal onto a fast-varying optical mask having a spatially-varying transmissivity $T_3(x)$ having a same value at more than one value of x in the x-range, and (ii) a third photodetector for converting the third portion, transmitted through the fast-varying optical mask, into a third electrical signal.

(C3) The repositionable mechanical structure denoted by (C2) may further include a signal processor configured to (i) determine first, second, and third signal amplitudes from the first, second, and third electrical signals, respectively, and (ii) determine a location parameter of the emitter by comparing the first, second, and third signal amplitudes.

(C4) In the repositionable mechanical structure denoted by (C3), the signal processor may determine the location parameter by: (i) determining a course-estimate location $x_2$ in the x-range and corresponding to a position on the slow-varying optical mask having transmissivity equal to the second signal amplitude divided by the first signal amplitude, (ii) determining a plurality of candidate locations $\{x_{3,1}, x_{3,2}, x_{3,3}, \ldots, x_{3,n}\}$ in the x-range and corresponding to positions on the fast-varying optical mask having transmissivity equal to the third signal amplitude divided by the first signal amplitude, (iii) determining a refined-estimate location, of the plurality of candidate locations, closest to course-estimate location $x_2$; and (iv) determining, based on the refined-estimate location, an angle of the object with respect to a plane perpendicular to the spatial dimension x and intersecting the masks.

(C5) In a repositionable mechanical structure denoted by one of (C3) and (C4), the optical signal the optical signal may be a modulated optical signal having a modulation frequency and a corresponding frequency-domain amplitude. The steps of determining the first, second, and third signal amplitude may further include: generating a first, second, and third frequency-domain representation of the imaged first portion, the imaged second portion, and the imaged third portion, respectively; determining, as the first, second, and third signal amplitude, the frequency-domain amplitude of the first, second, and third frequency-domain representation, respectively.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. An angular localization system for determining a location parameter of an object, comprising:
   a receiver including a first channel, a second channel, and a third channel,
   the first channel including (i) a first lens for imaging a first portion of an optical signal from the object, and (ii) a first photodetector for converting the imaged first portion, into a first electrical signal;
   the second channel including (i) a second lens for imaging a second portion of the optical signal onto a slow-varying optical mask having a strictly monotonic transmissivity $T_2(x)$ in an x-range of a spatial dimension x, and (ii) a second photodetector for converting the second portion, transmitted through the slow-varying optical mask, into a second electrical signal;
   the third channel including (i) a third lens for imaging a third portion of the optical signal onto a fast-varying optical mask having a spatially-varying transmissivity $T_3(x)$ having a same value at more than one value of x in the x-range, and (ii) a third photodetector for converting the third portion, transmitted through the fast-varying optical mask, into a third electrical signal;
   a signal processor configured to (i) determine a first, second, and third signal amplitude from the first, second, and third electrical signals, respectively, and (ii) determine the location parameter by comparing the first, second, and third signal amplitudes.

2. The angular localization system of claim 1, the optical signal being a modulated optical signal having a modulation frequency, the first, second, and third signal amplitudes being a respective first, second, and third frequency-domain amplitude, corresponding to the modulation frequency, of the first, second, and third electrical signals.

3. The angular localization system of claim 1, each of the first, second, and third channels having a respective field of view that overlaps with a field of view of both other channels.

4. The angular localization system of claim 1, further comprising a uniform optical mask between the first photodetector and the first lens and having a uniform transmissivity that equals or exceeds a maximum transmissivity of the slow-varying optical mask and a maximum transmissivity of the fast-varying optical mask.

5. The angular localization system of claim 1, the signal processor configured to determine the location parameter by:
   determining a course-estimate location $x_2$ in the x-range and corresponding to a position on the slow-varying optical mask having transmissivity equal to the second signal amplitude divided by the first signal amplitude;
   determining a plurality of candidate locations $\{x_{3,1}, x_{3,2}, x_{3,3}, \ldots, x_{3,n}\}$ in the x-range and corresponding to positions on the fast-varying optical mask having transmissivity equal to the third signal amplitude divided by the first signal amplitude;
   determining a refined-estimate location, of the plurality of candidate locations, closest to course-estimate location $x_2$; and
   determining, based on the refined-estimate location, an angle of the object with respect to a plane perpendicular to the spatial dimension x and intersecting the masks.

6. The angular localization system of claim 1, further comprising an emitter for at least one of (i) emitting and (ii) reflecting the optical signal, the emitter being located either (a) on the object or (b) proximate the receiver and configured to direct the optical signal at least toward a reflector mounted on the object.

7. The angular localization system of claim 1, the optical signal having a free-space wavelength between 0.75 micrometers and 2.0 micrometers.

8. The angular localization system of claim 1, the spatially-varying transmissivity $T_3(x)$ being a periodic function of x.

9. The angular localization system of claim 1, a portion of the slow-varying mask and a portion of the fast-varying mask being collinear along a line perpendicular to the x-dimension.

10. The angular localization system of claim 1,
    the slow-varying optical mask spanning the x-range in spatial dimension x and spanning first y-range in a spatial dimension y orthogonal to spatial dimension x, transmissivity $T_2(x)$ being independent of y; and
    the fast-varying optical mask spanning the x-range in spatial dimension x and spanning a second y-range in spatial dimension y, transmissivity $T_3(x)$ being independent of y.

11. The angular localization system of claim 1, spatially-varying transmissivity $T_3(x)$ being a periodic function having a period $\Lambda_x$, the receiver further comprising:
    a fourth channel including (i) a fourth lens for imaging a fourth portion of the optical signal onto a second fast-varying optical mask having a spatially-varying transmissivity $T_4(x)=T_3(X+\Delta_x)$, $\Delta_x \leq 0.5\Lambda_x$, and (ii) a fourth photodetector for converting the fourth portion, transmitted through the second fast-varying optical mask, into a fourth electrical signal,
    the signal processor being further configured to (i) determine a fourth signal amplitude from the fourth electrical signals, and (ii) determine the location parameter by comparing the first, second, third, and fourth signal amplitudes.

12. A method for determining a location parameter of an object, the method comprising:
    imaging a first portion of an optical signal from the object;
    determining a first signal amplitude of the imaged first portion;
    imaging a second portion of the optical signal onto a slow-varying optical mask having a strictly monotonic transmissivity $T_2(x)$, in an x-range of a spatial dimension x;
    determining a second signal amplitude of the second portion transmitted through the slow-varying optical mask;
    imaging a third portion of the optical signal onto a fast-varying optical mask having a spatially-varying transmissivity $T_3(x)$ having a same value at more than one value of x in the x-range;
    determining a third signal amplitude of the third portion transmitted through the fast-varying optical mask;
    determining a course-estimate location $x_2$ in the x-range and corresponding to a location on the slow-varying optical mask having transmissivity equal to the second signal amplitude divided by the first signal amplitude;

determining a plurality of candidate locations $\{x_{3,1}, x_{3,2}, x_{3,3}, \ldots, x_{3,n}\}$ in the x-range and corresponding to locations on the fast-varying optical mask having transmissivity equal to the third signal amplitude divided by the first signal amplitude;

determining a refined-estimate location, of the plurality of candidate locations, closest to course-estimate location $x_2$; and determining, based on the refined-estimate location, an angle of the object with respect to a plane perpendicular to the spatial dimension x and intersecting the masks.

13. The method of claim 12, the step of imaging the first portion comprising imaging the first portion onto a uniform optical mask having a uniform transmissivity that equals or exceeds a maximum transmissivity of the second optical mask.

14. The method of claim 12, the optical signal being a modulated optical signal having a modulation frequency and a corresponding frequency-domain amplitude, the steps of determining the first, second, and third signal amplitude further comprising:

generating a first, second, and third frequency-domain representation of the imaged first portion, the imaged second portion, and the imaged third portion, respectively;

determining, as the first, second, and third signal amplitude, the frequency-domain amplitude of the first, second, and third frequency-domain representation, respectively.

15. A repositionable mechanical structure comprising:
a repositionable part;
a receiver that includes
a first channel including (i) a first lens for imaging a first portion of an optical signal from the object, and (ii) a first photodetector for converting the imaged first portion, into a first electrical signal;
a second channel including (i) a second lens for imaging a second portion of the optical signal onto a slow-varying optical mask having a strictly monotonic transmissivity $T_2(x)$ in an x-range of a spatial dimension x, and (ii) a second photodetector for converting the second portion, transmitted through the slow-varying optical mask, into a second electrical signal;
a third channel including (i) a third lens for imaging a third portion of the optical signal onto a fast-varying optical mask having a spatially-varying transmissivity $T_3(x)$ having a same value at more than one value of x in the x-range, and (ii) a third photodetector for converting the third portion, transmitted through the fast-varying optical mask, into a third electrical signal;
an emitter on the repositionable part for emitting an optical signal to the receiver;
a controller adapted to receive a control signal from a transmitter communicatively coupled to the receiver; and,
an actuator communicatively coupled to the controller and mechanically coupled to the repositionable part for actuating the repositionable part based on the control signal.

16. The repositionable mechanical structure of claim 15, further comprising:
a signal processor configured to (i) determine first, second, and third signal amplitudes from the first, second, and third electrical signals, respectively, and (ii) determine a location parameter of the emitter by comparing the first, second, and third signal amplitudes.

17. The repositionable mechanical structure of claim 16, the signal processor determining the location parameter by:
determining a course-estimate location $x_2$ in the x-range and corresponding to a position on the slow-varying optical mask having transmissivity equal to the second signal amplitude divided by the first signal amplitude;
determining a plurality of candidate locations $\{x_{3,1}, x_{3,2}, x_{3,3}, \ldots, x_{3,n}\}$ in the x-range and corresponding to positions on the fast-varying optical mask having transmissivity equal to the third signal amplitude divided by the first signal amplitude;
determining a refined-estimate location, of the plurality of candidate locations, closest to course-estimate location $x_2$; and
determining, based on the refined-estimate location, an angle of the object with respect to a plane perpendicular to the spatial dimension x and intersecting the masks.

18. The repositionable mechanical structure of claim 15, the optical signal being a modulated optical signal having a modulation frequency, the first, second, and third signal amplitudes being a respective first, second, and third frequency-domain amplitude, corresponding to the modulation frequency, of the first, second, and third electrical signals.

* * * * *